United States Patent
Okabe et al.

(10) Patent No.: US 7,990,635 B2
(45) Date of Patent: Aug. 2, 2011

(54) CAMERA MODULE

(75) Inventors: Takahiro Okabe, Tokyo (JP); Yasutaka Takahashi, Chiba (JP); Noritoshi Eguchi, Saitama (JP); Mitsuru Ichikawa, Saitama (JP); Satoshi Imai, Kanagawa (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 12/598,818

(22) PCT Filed: Jan. 22, 2009

(86) PCT No.: PCT/JP2009/050930
§ 371 (c)(1),
(2), (4) Date: Nov. 4, 2009

(87) PCT Pub. No.: WO2009/110257
PCT Pub. Date: Sep. 11, 2009

(65) Prior Publication Data
US 2010/0142066 A1 Jun. 10, 2010

(30) Foreign Application Priority Data
Mar. 5, 2008 (JP) ................................. 2008-055215

(51) Int. Cl.
*G02B 27/00* (2006.01)
(52) U.S. Cl. .......................... 359/824; 359/819; 359/813
(58) Field of Classification Search .................. 359/824, 359/819, 821, 822, 823, 811, 813, 814
See application file for complete search history.

(56) References Cited

U.S. PATENT DOCUMENTS
2005/0152050 A1 7/2005 Noda et al.
2010/0007971 A1* 1/2010 Usami et al. .................. 359/811

FOREIGN PATENT DOCUMENTS
| JP | 3 124292 | 5/1991 |
| JP | 7 159663 | 6/1995 |
| JP | 2000 266912 | 9/2000 |
| JP | 2005 202020 | 7/2005 |
| JP | 2006 81043 | 3/2006 |
| JP | 2007 108597 | 4/2007 |

* cited by examiner

*Primary Examiner* — Timothy J Thompson
(74) *Attorney, Agent, or Firm* — Frommer Lawrence & Haug LLP; William S. Frommer

(57) ABSTRACT

A lens holding member (30) is molded by filling a molten synthetic resin from a gate of a mold into a product cavity, and a portion corresponding to the gate of the mold for molding remains thereon as a gate portion (72). By mounting a coil (52) on a rear cylindrical face (60), an adhesive filling recess (70) that opens in a direction parallel to an optical axis of an image pickup optical system (28) is defined by a center face (66), side faces (68) standing from both sides of the center face (66), an outer face (58), and an inner peripheral surface of the coil (52). The gate portion (72) is provided on the center face (66) of the adhesive filling recess (70). By filling the adhesive filling recess (74) with adhesive B, an outer peripheral portion of the lens holding member (30) and an inner peripheral portion of the coil (52) are bonded together, and the gate portion (72) is buried in the adhesive B. These provide a camera module that is advantageous in effectively preventing dust from being generated from the gate portion without necessitating any special treatment process.

4 Claims, 25 Drawing Sheets

FIG. 29
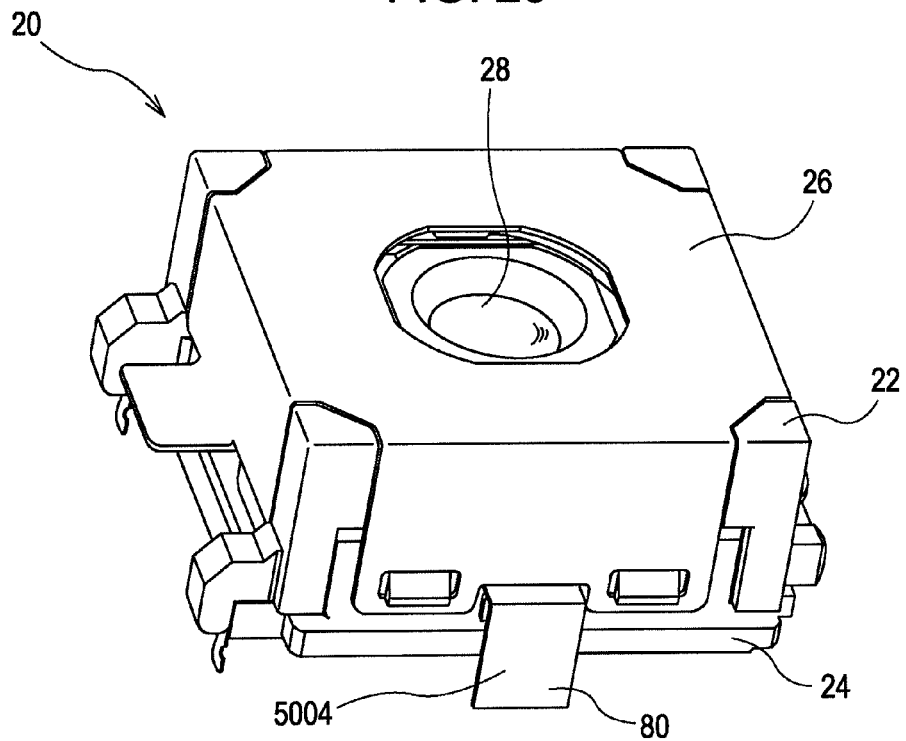
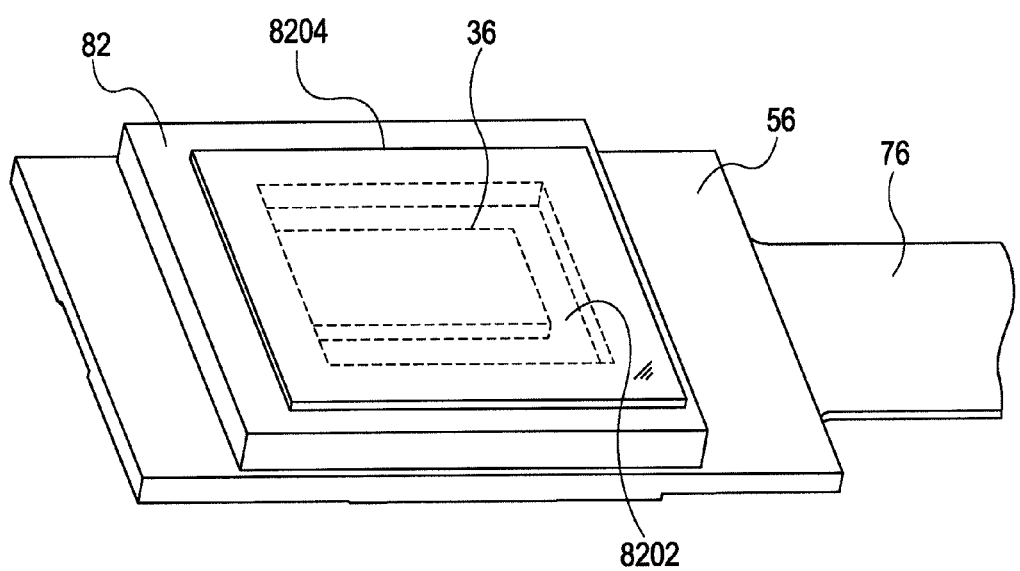

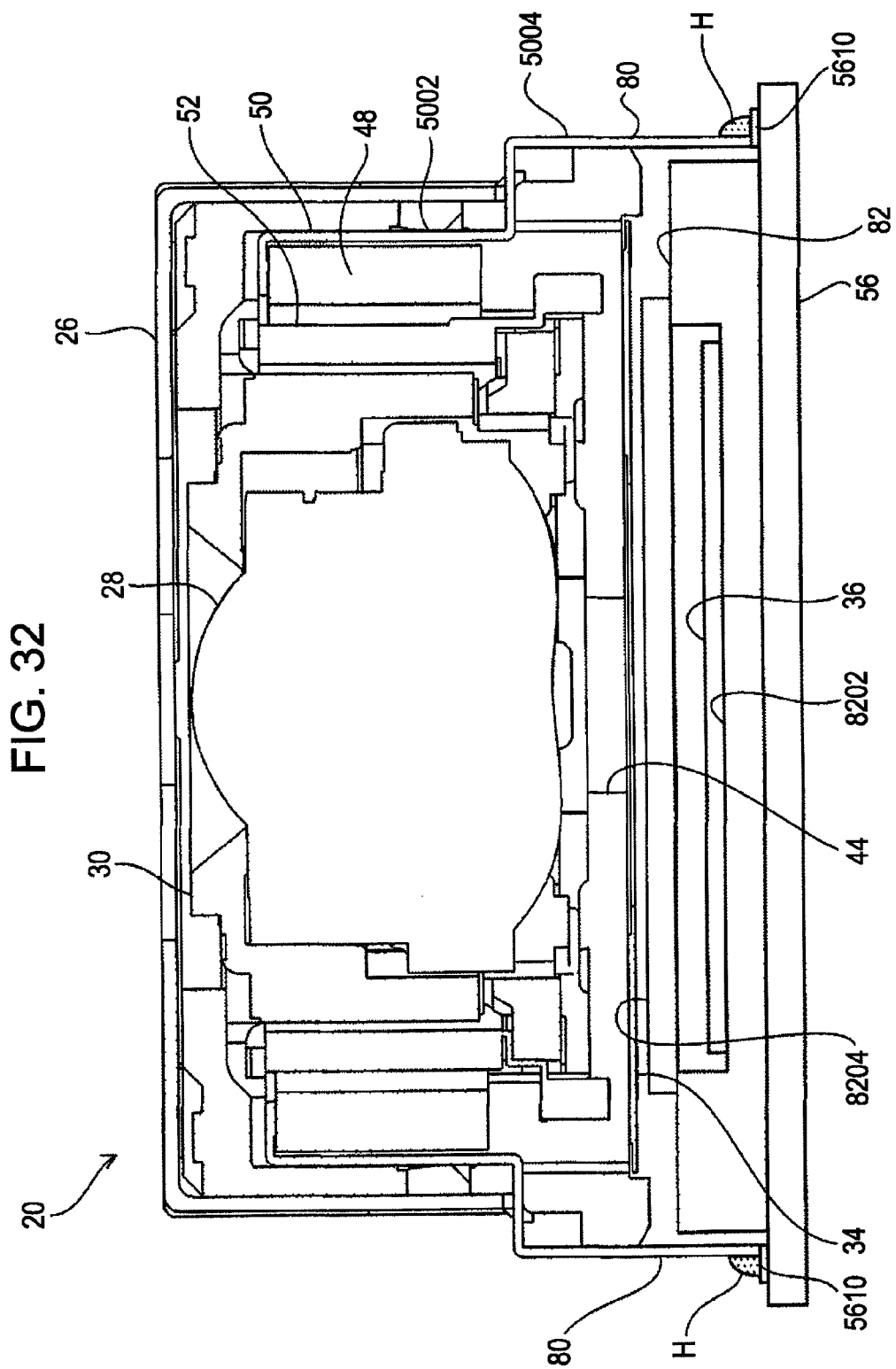

CAMERA MODULE

TECHNICAL FIELD

The present invention relates to a camera module incorporated in, for example, a portable electronic apparatus.

BACKGROUND ART

There have recently been provided electronic apparatuses in which camera modules are incorporated, for example, mobile telephones and PDAs (Personal Digital Assistants).

A camera module includes a lens holding member for holding an image pickup optical system, a barrel containing the lens holding member, a spring supporting the lens holding member in the barrel so that the lens holding member is movable along the optical axis of the image pickup optical system, an image pickup element for picking up a subject image guided by the image pickup optical system, and a driving unit for moving the lens holding member along the optical axis (see Japanese Unexamined Patent Application Publication No. 2007-108597).

In many cases, the lens holding member is molded by filling a molten synthetic resin from a gate of a mold into a cavity. In this case, to ensure the hardness required of the lens holding member, the synthetic resin contains fillers such as glass fibers.

DISCLOSURE OF INVENTION

Incidentally, with molding of the lens holding member, a gate portion corresponding to the gate of the mold remains on a surface of the lens holding member.

Since this gate portion has a small cross section, the density of the fillers is apt to become high thereat.

For this reason, when a vibration or impact is applied to the lens holding member, there is a fear that the fillers will fall off as powdered dust from a cut portion of the gate portion and that the falling dust will adhere to a lens of the image pickup optical system or an image pickup surface of the image pickup element, which will adversely affect the quality of data on a picked-up image.

Accordingly, a special treatment process for preventing dust generation, for example, by coating the cut portion of the gate portion with an adhesive or melting the cut portion of the gate portion with a heater is necessary. This is disadvantageous for reduction of production cost.

The present invention has been made in view of these circumstances, and an object of the invention is to provide a camera module that is advantageous in effectively preventing dust generation from a gate portion without necessitating any special treatment process.

In order to achieve the above object, the present invention is a camera module including a lens holding member for holding an image pickup optical system, and a driving unit for moving the lens holding member along an optical axis of the image pickup optical system. The lens holding member is a molded component molded using a mold, and has a gate portion remaining on a surface thereof corresponding to a gate of the mold. The driving unit includes a coil mounted on the outer periphery of the lens holding member, and a magnet facing the outer periphery of the coil. An adhesive filling recess that opens in a direction parallel to the optical axis is defined by an outer peripheral portion of the lens holding member and an inner peripheral portion of the coil. The adhesive filling recess includes a bottom face provided in the lens holding member and facing in the direction parallel to the optical axis. The gate portion is located on the bottom face. The outer periphery of the lens holding member and the inner periphery of the coil are bonded with an adhesive filled in the adhesive filling recess, and the gate portion is buried in the adhesive.

For this reason, according to the present invention, the gate portion is buried in the adhesive filled in the adhesive filling recess. This is advantageous in effectively preventing dust generation from the gate portion without necessitating any special treatment process.

BRIEF DESCRIPTION OF DRAWINGS

FIG. 29 is an explanatory view illustrating assembly of an image pickup element 36 with the camera module 20.

FIG. 32 is a cross-sectional view of a camera module 20 according to a second example having a heat radiation structure.

BEST MODE FOR CARRYING OUT THE INVENTION

Next, an embodiment of the present invention will be described with reference to the drawings.

FIGS. 1(A) and 1(B) are external views showing an example of an electronic apparatus in which a camera module 20 according to the embodiment is incorporated.

Figure 1:
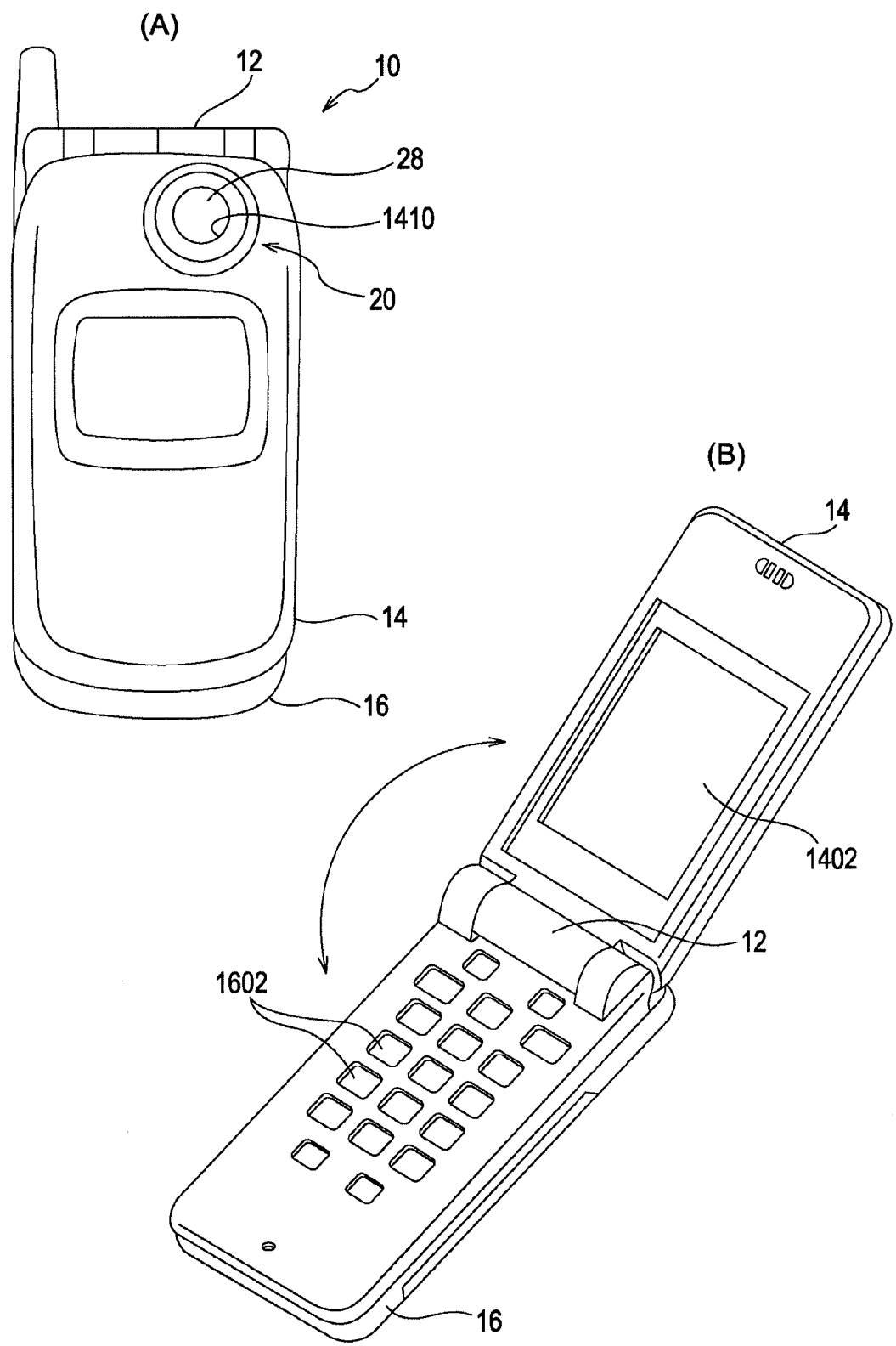
FIGS. 1(A) and 1(B) are external views of an example of an electronic apparatus in which a camera module 20 according to an embodiment is incorporated.

As shown in FIG. 1, an electronic apparatus 10 is a mobile telephone, and includes first and second housings 14 and 16 pivotally connected by a hinge portion 12.

A liquid crystal display panel 1402 is provided on an inner surface of the first housing 14, and operation switches 1602, such as ten keys and function keys, are provided on an inner surface of the second housing 16.

The camera module 20 is provided in the first housing 14, and an image picked up by the camera module 20 is displayed on the liquid crystal display panel 1402.

The camera module 20 includes an image pickup optical system 28 that captures a subject image, and the image pickup optical system 28 faces an aperture 1410 provided in the first housing 14.

Next, a configuration of a camera module 20 according to the present invention will be described in detail.

Figure 2:
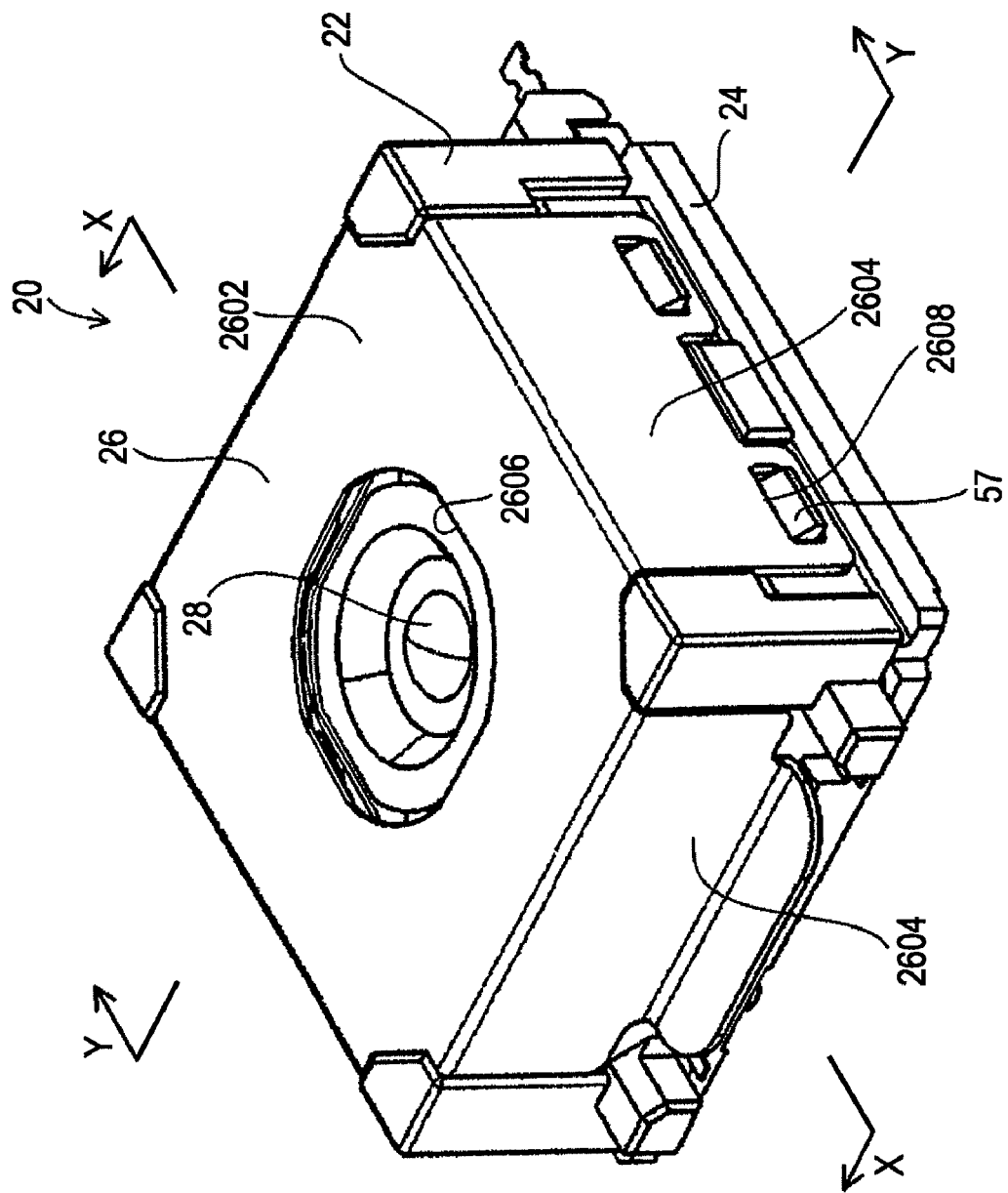
FIG. 2 is a perspective view of the camera module 20.
Figure 3:
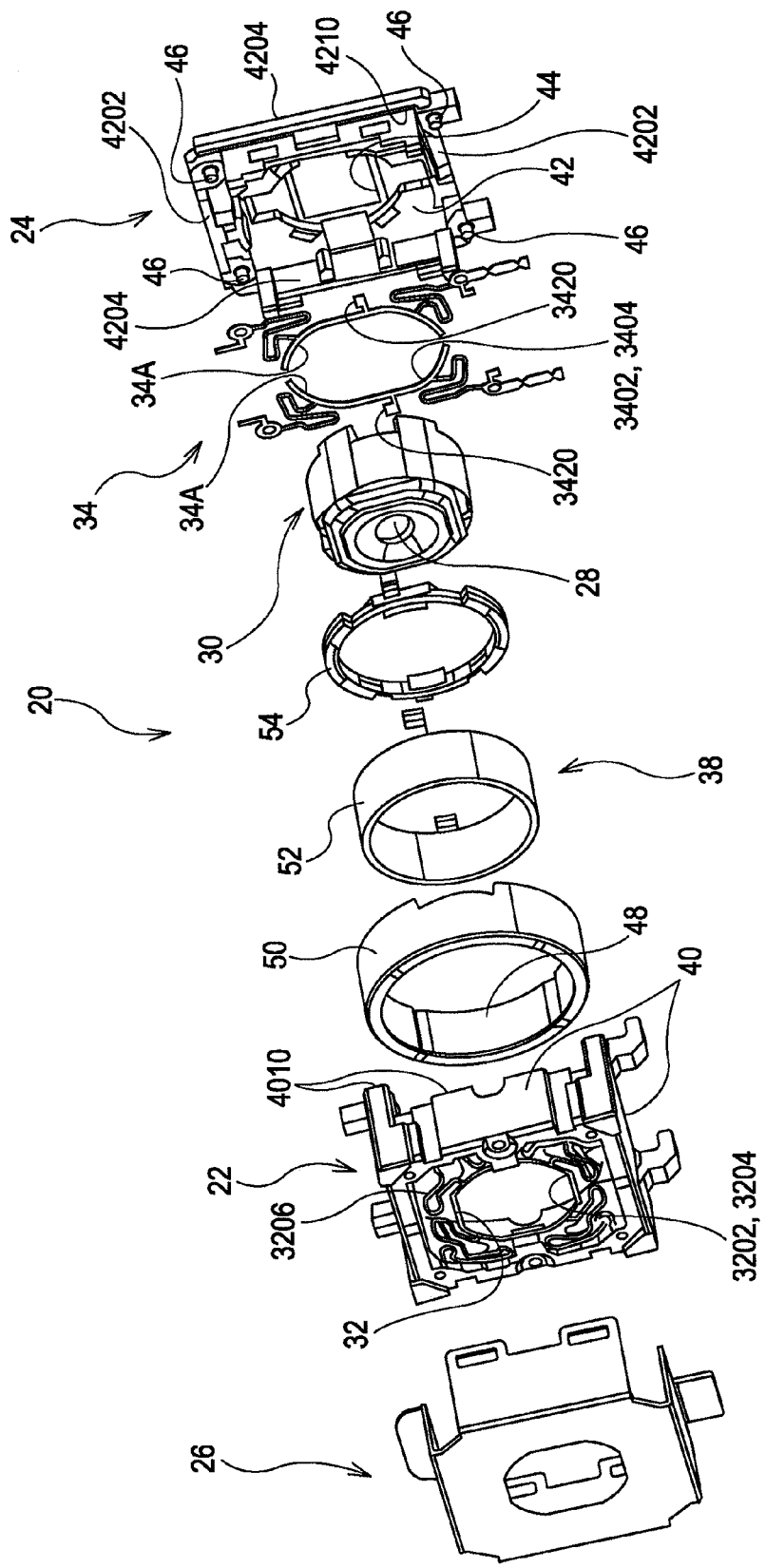
FIG. 3 is an exploded perspective view of the camera module 20.
Figure 4:
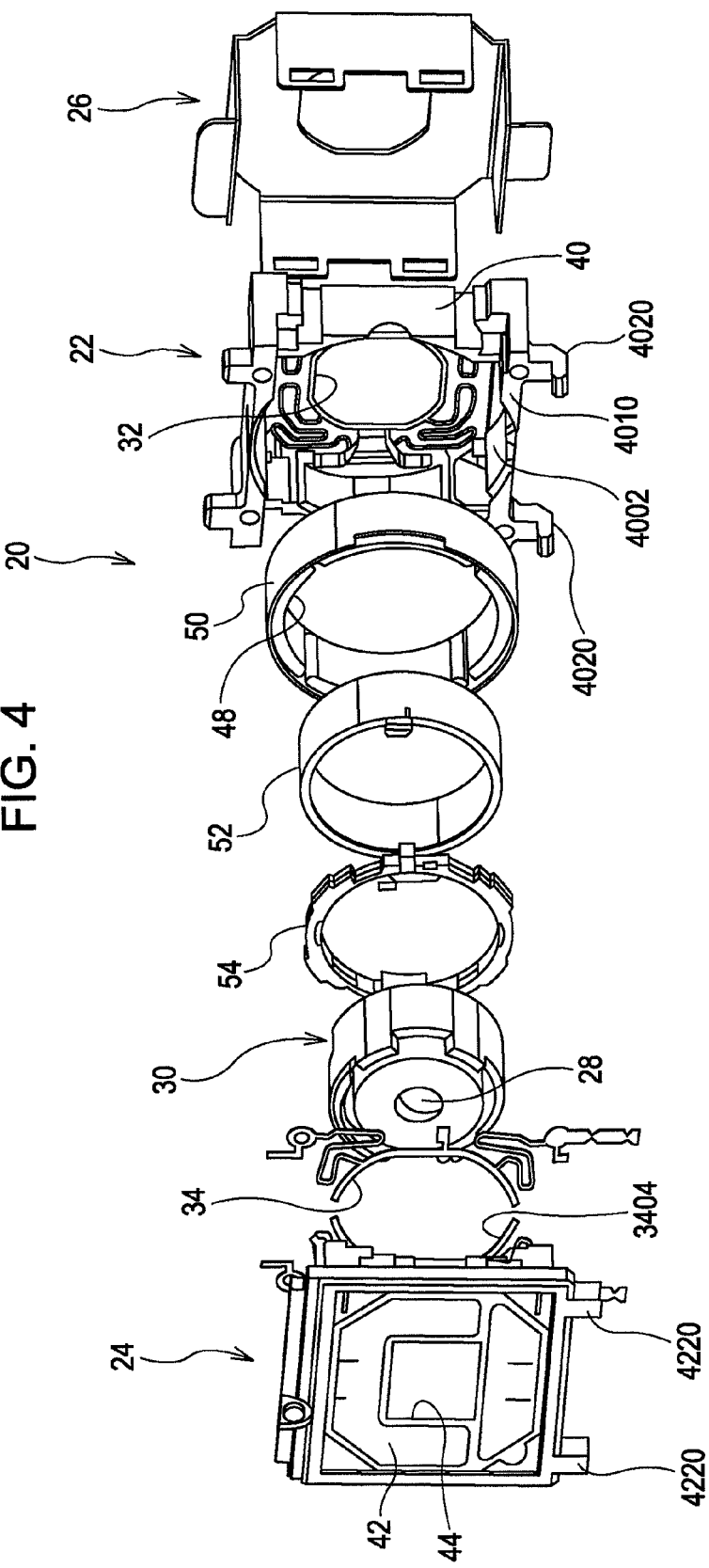
FIG. 4 is an exploded perspective view of the camera module 20.
Figure 5:
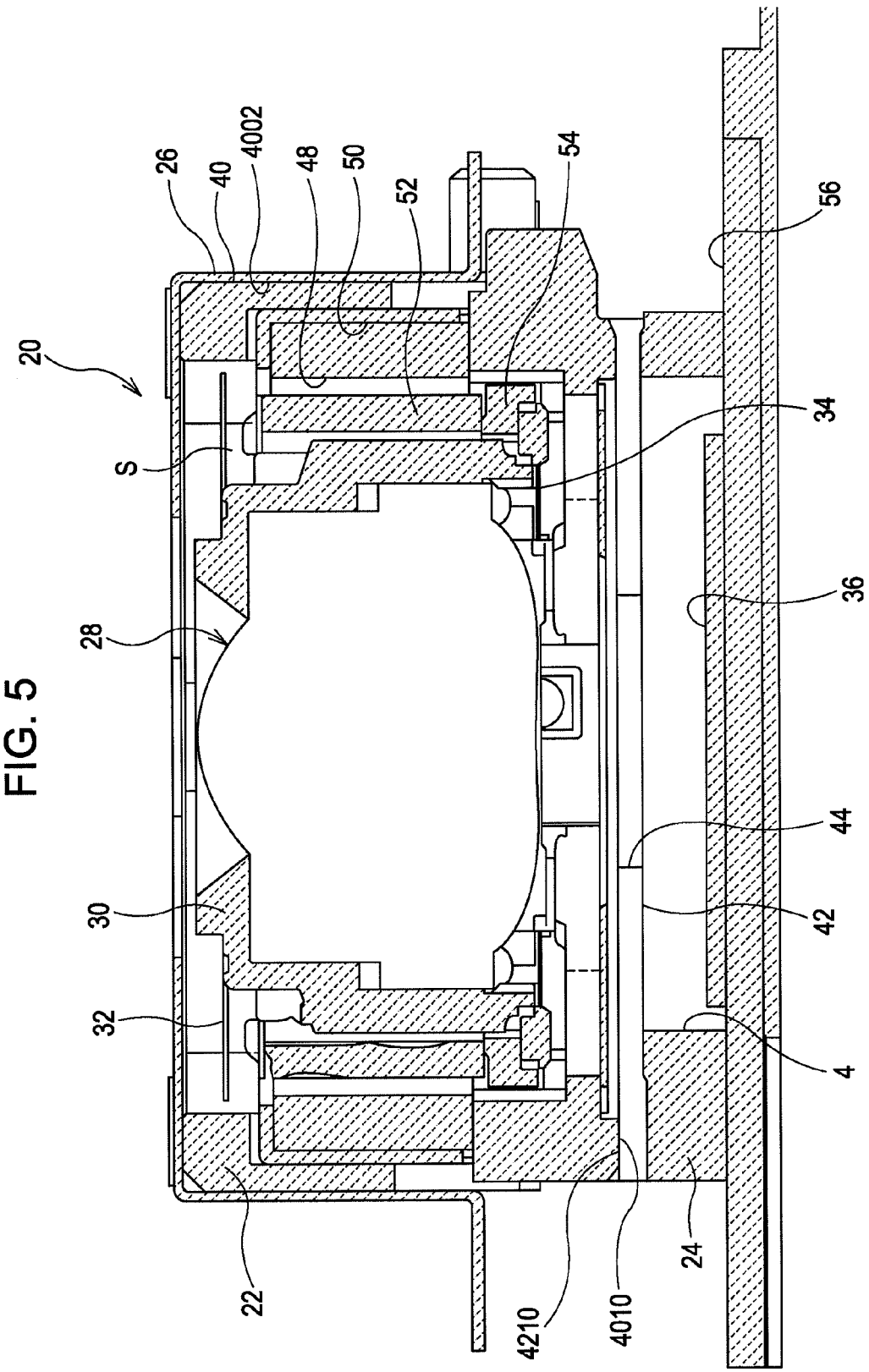
FIG. 5 is a cross-sectional view, taken along line X-X in FIG. 2.
Figure 6:
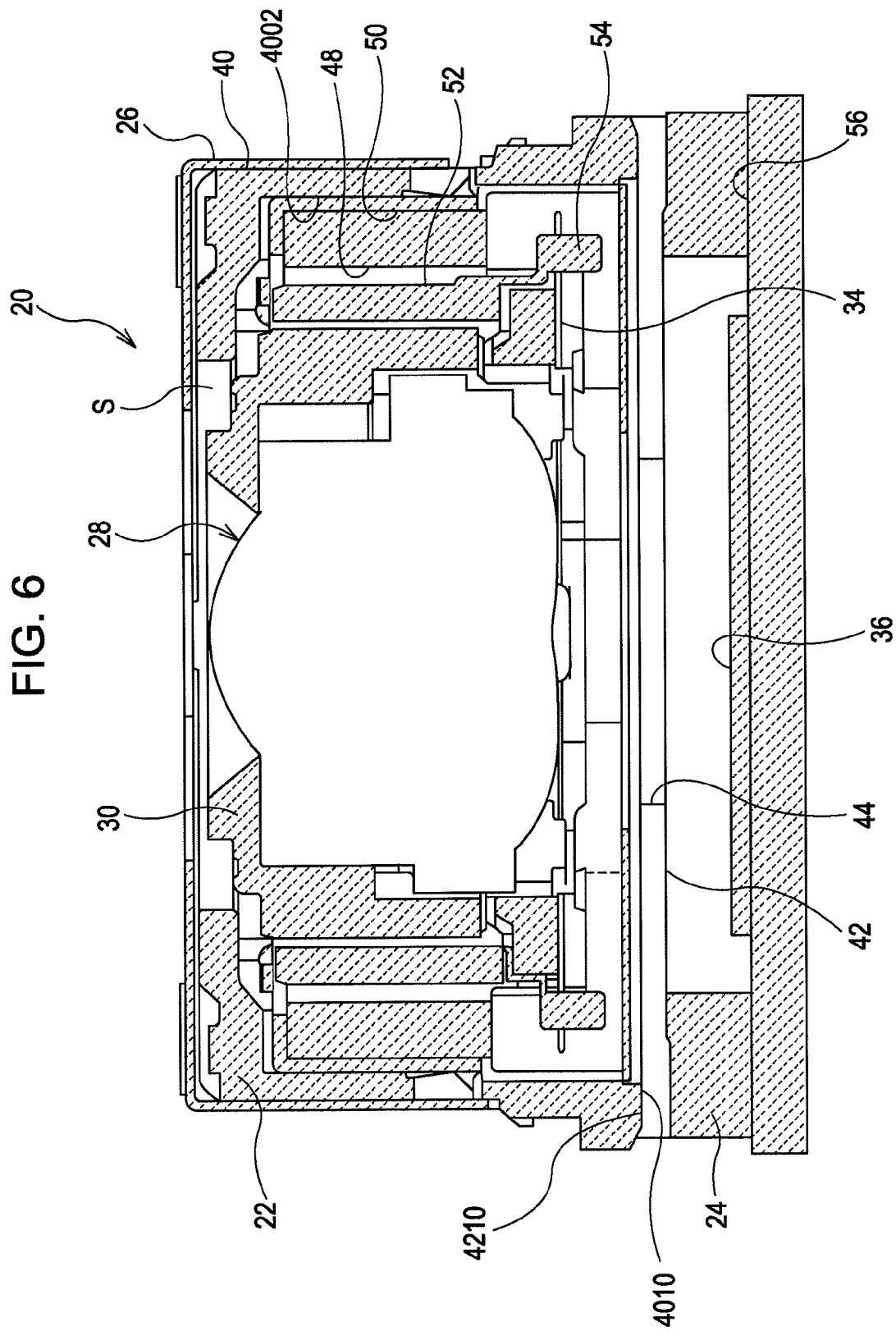
FIG. 6 is a cross-sectional view, taken along line Y-Y in FIG. 2.
Figure 19:
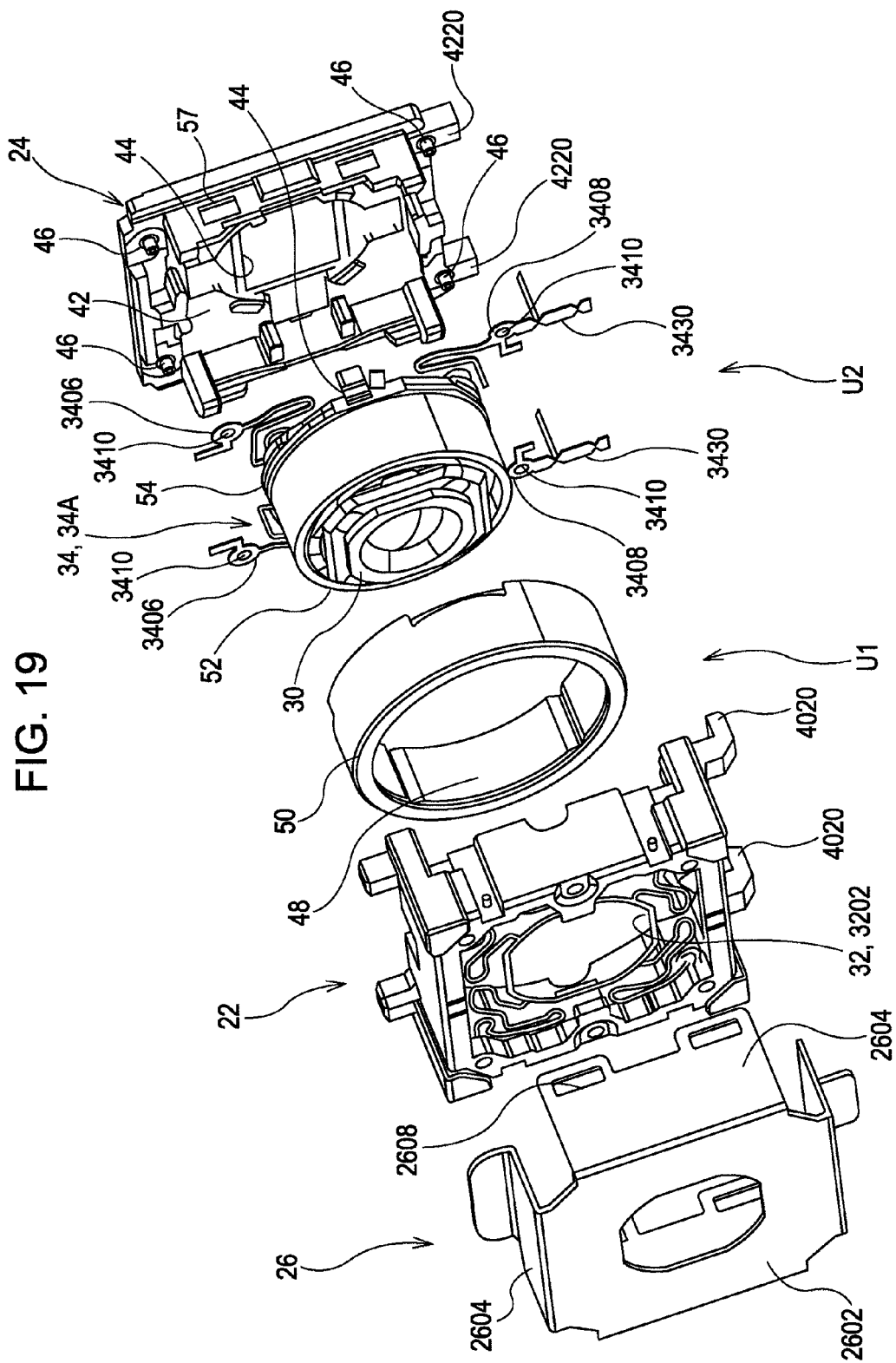
FIG. 19 is an exploded perspective view of the camera module 20.

FIG. 2 is a perspective view of the camera module 20, FIGS. 3, 4, and 19 are exploded perspective views of the camera module 20, FIG. 5 is a cross-sectional view taken along line X-X in FIG. 2, and FIG. 6 is a cross-sectional view taken along line Y-Y in FIG. 2.

Figure 7:
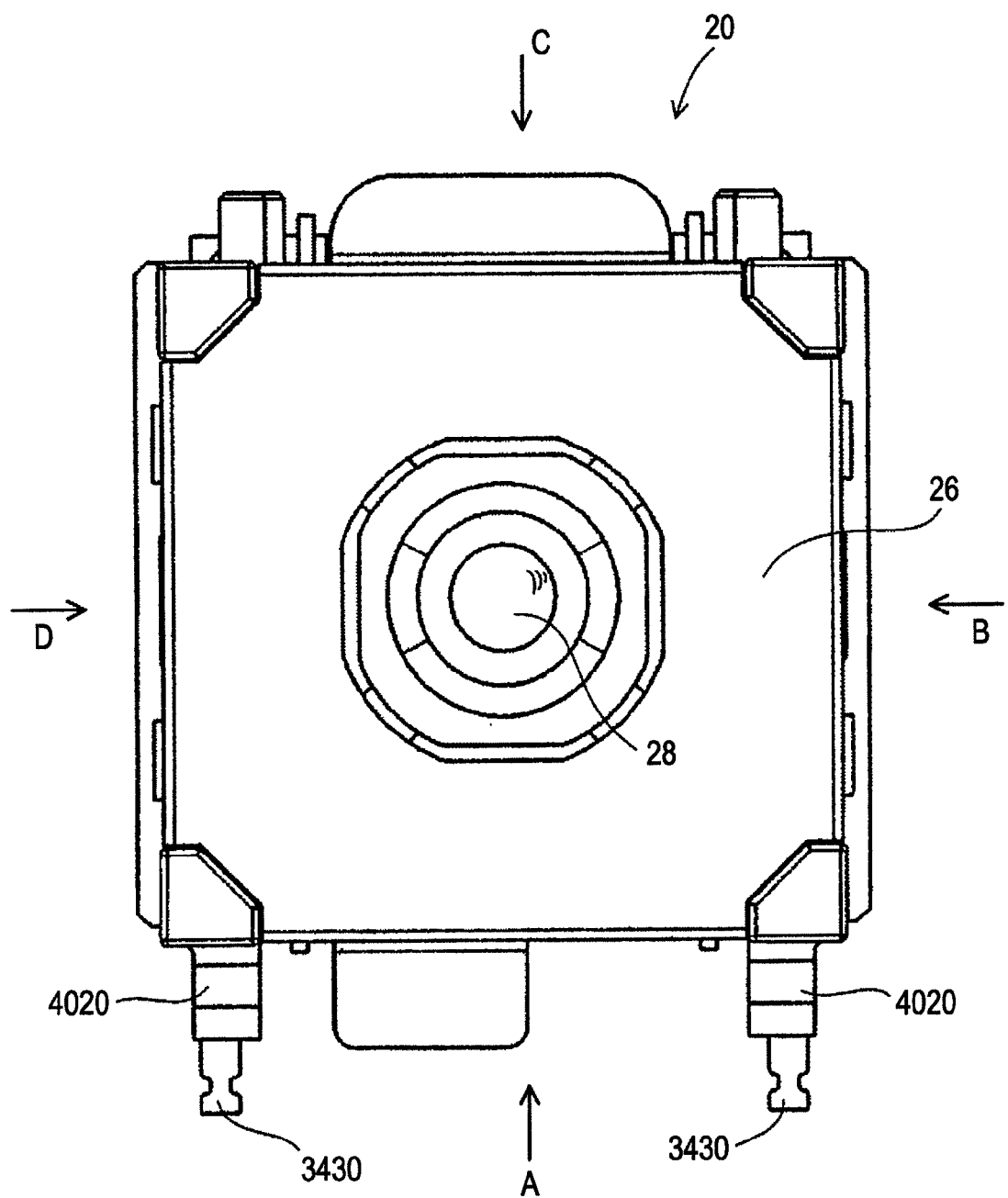
FIG. 7 is a plan view of the camera module 20.
Figure 8:
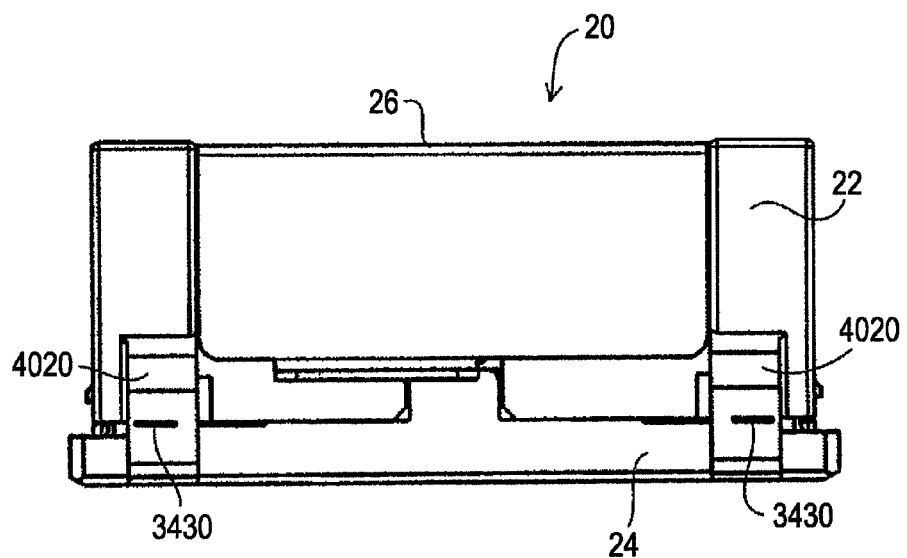
FIG. 8 is a view on arrow A in FIG. 7.
Figure 9:
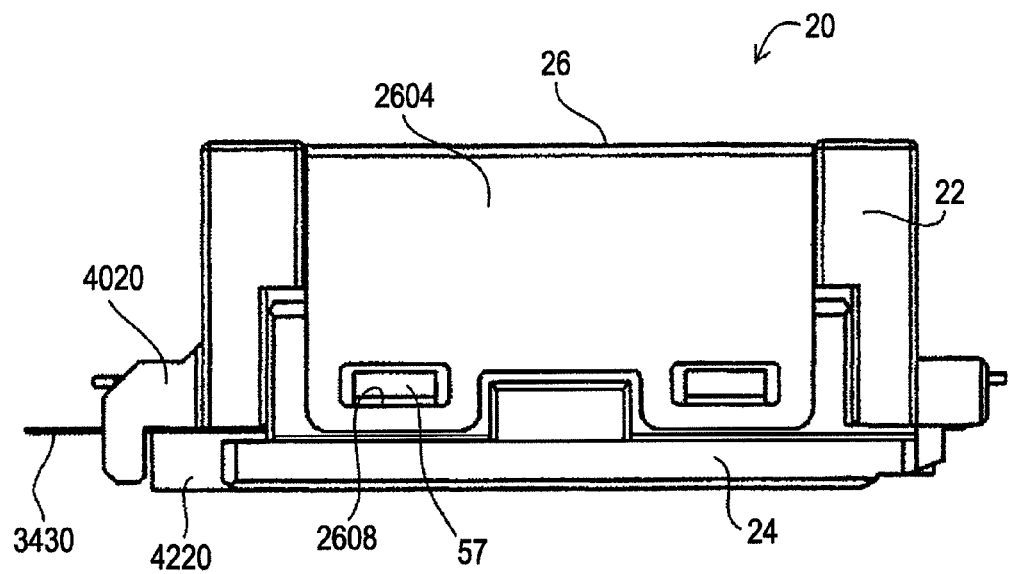
FIG. 9 is a view on arrow B in FIG. 7.
Figure 10:
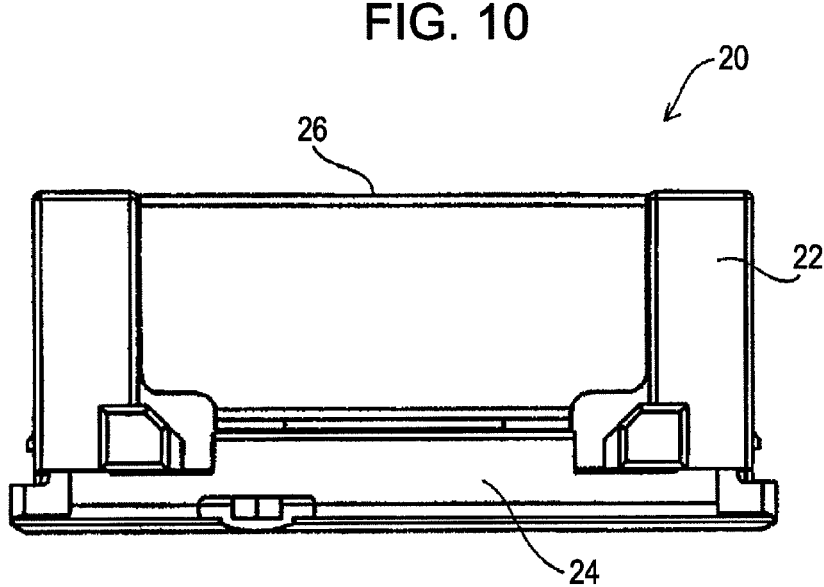
FIG. 10 is a view on arrow C in FIG. 7.
Figure 11:
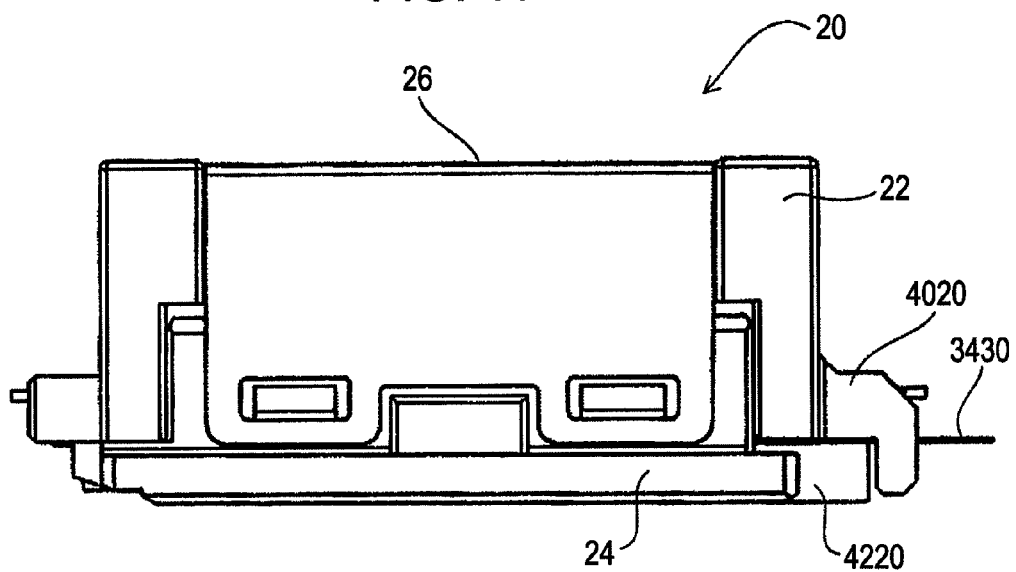
FIG. 11 is a view on arrow D in FIG. 7.
Figure 12:
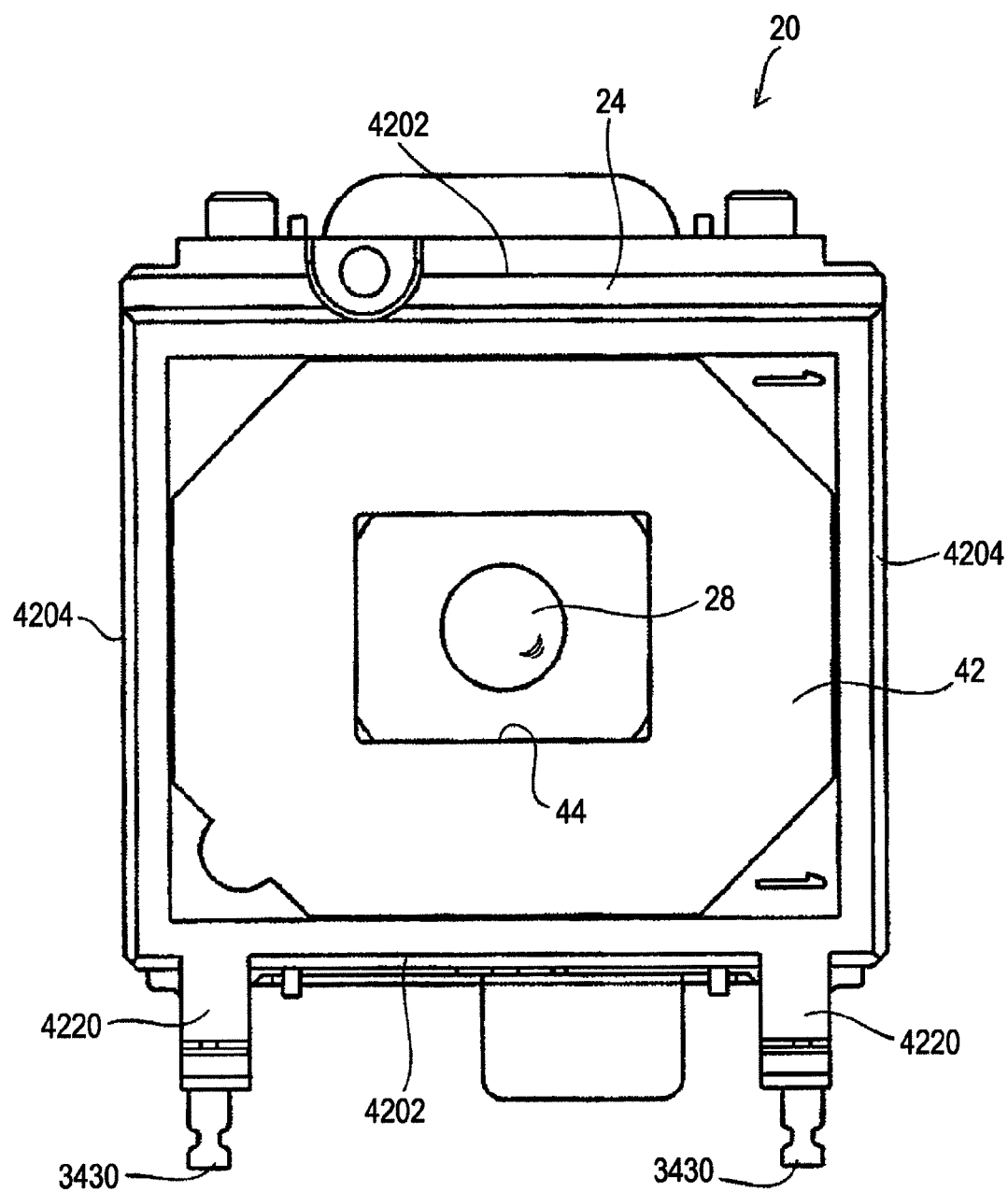
FIG. 12 is a rear view of FIG. 7.

FIG. 7 is a plan view of the camera module 20, FIG. 8 is a view on arrow A in FIG. 7, FIG. 9 is a view on arrow B in FIG. 7, FIG. 10 is a view on arrow C in FIG. 7, FIG. 11 is a view on arrow D in FIG. 7, and FIG. 12 is a rear view of FIG. 7.

FIGS. 2 to 4 and 7 to 12 show a state in which a substrate 56 is removed from the camera module 20.

In the description of this embodiment, the side of a subject is the front side, and the opposite side is the rear side.

As shown in FIGS. 3 to 6, the camera module 20 includes a front barrel 22, a rear barrel 24, a cover 26, a lens holding member 30, a front spring 32, a rear spring 34, an image pickup element 36, a driving unit 38, etc., in addition to the above-described image pickup optical system 28.

(Front Barrel 22)

The front barrel 22 is assembled with the rear barrel 24 to form a storage space S (FIG. 5, FIG. 6) with the rear barrel 24.

As shown in FIGS. 4, 5, and 6, the front barrel 40 includes a peripheral wall 40.

An inner surface of the peripheral wall 40 is provided as a magnet mounting surface 4002 formed by a cylindrical surface, and an outer surface of the peripheral wall 40 is rectangular.

The front barrel 22 is formed by molding a synthetic resin material with a mold.

As shown in FIGS. 3 and 4, a rear end face of the peripheral wall 40 facing rearward is provided as a matching face 4010 for the rear barrel 24.

Further, as shown in FIG. 4, two front projections 4020 protrude from both rear ends of two opposing outer faces of the peripheral wall 40 of the front barrel 22.

(Rear Barrel 24)

As shown in FIGS. 3 to 6, the rear barrel 24 includes a bottom wall 42 and an aperture 44.

The bottom wall 42 is shaped like a rectangle that closes the rear end of the storage space S in the optical axis direction. Therefore, a front surface of the bottom wall 42 faces the storage space S.

The bottom wall 42 has two opposing pairs of sides 4202 and 4204. Two pins 46 for mounting the rear spring 34 protrude from the side 4202 of each pair.

Portions extending along the four sides 4202 and 4204 of the front surface of the bottom wall 42 are provided as matching faces 4210 for the matching face 4010 of the front barrel 22.

As shown in FIGS. 5 and 6, the matching faces 4210 of the rear barrel 24 are placed on the matching face 4010 of the front barrel 22.

Further, as shown in FIG. 4, two rear projections 4220 protrude from both ends of one side of the bottom wall 42.

The aperture 44 is provided in the center of the bottom wall 42, and is shaped like a rectangle.

(Magnet 48)

As shown in FIGS. 3 to 6, the driving unit 38 includes a magnet 48 and a coil 52.

The magnet 48 extends on a circumference centered on the optical axis of the image pickup optical system 28. In this embodiment, the magnet 48 is defined by four magnet segments of the same shape arranged in the circumferential direction, and faces the outer periphery of the coil 52.

In this embodiment, the magnet 48 is attached to an inner peripheral surface of a yoke 50 shaped like a cylindrical wall that efficiently guides the magnetic flux of the magnet 48 to the coil 52, and is attached to the magnet mounting face 4002 of the front barrel 24 via the yoke 50.

(Coil 52)

Figure 13:
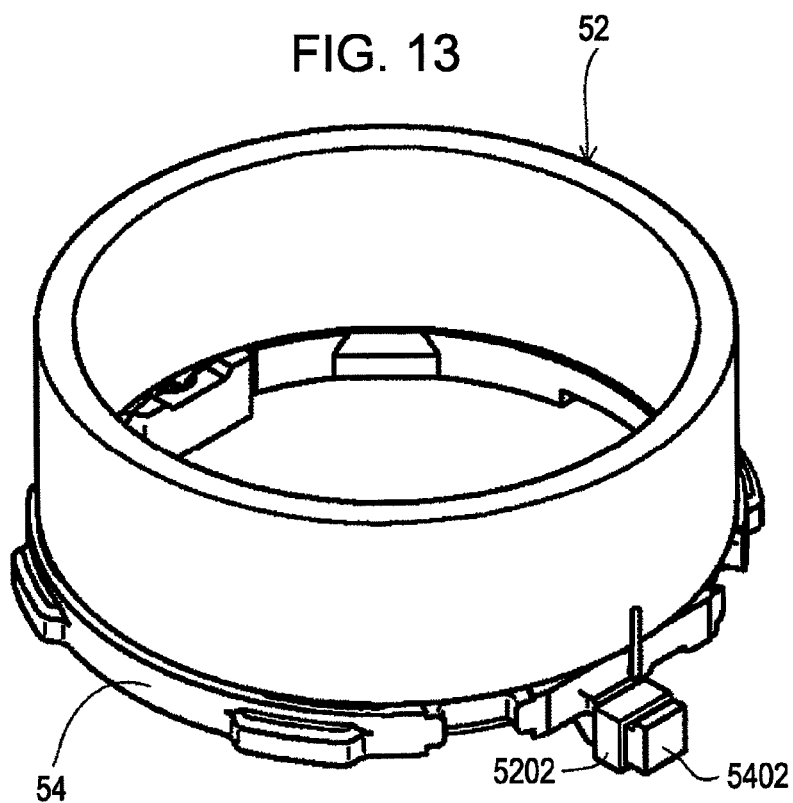
FIG. 13 is a front perspective view of a coil 52.
Figure 14:
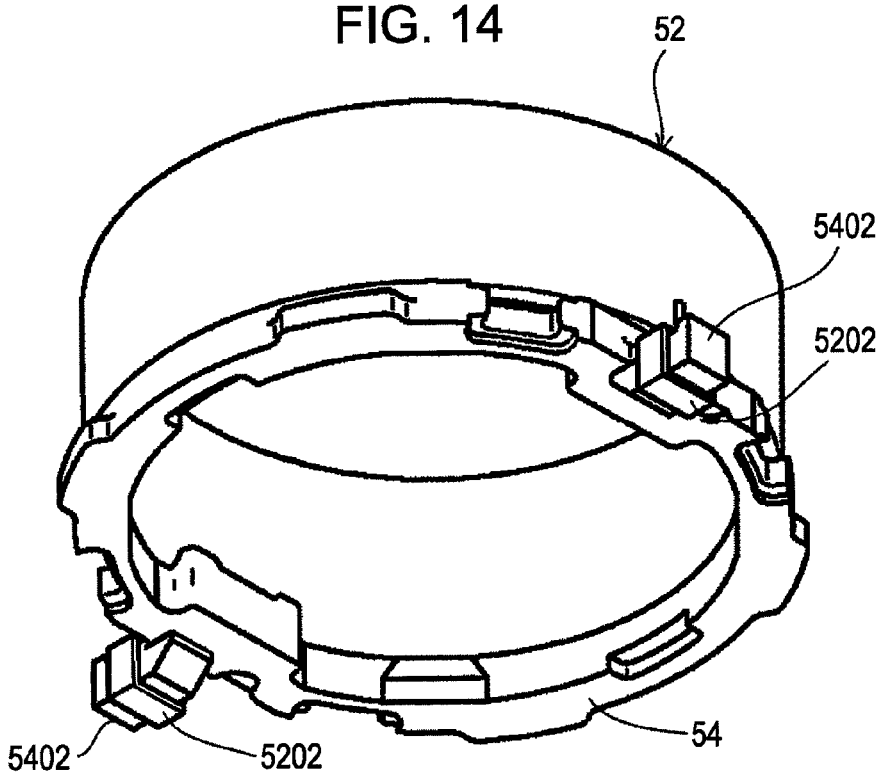
FIG. 14 is a rear perspective view of the coil 52.
Figure 15:
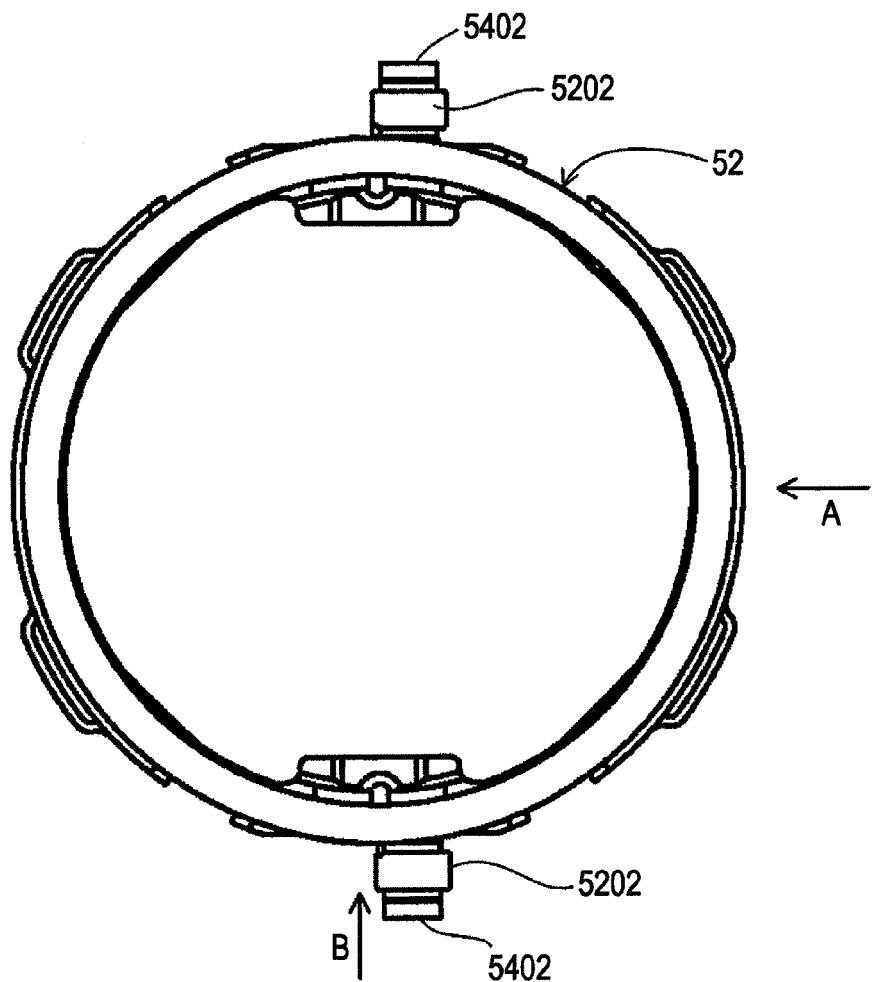
FIG. 15 is a plan view of the coil 52.
Figure 16:
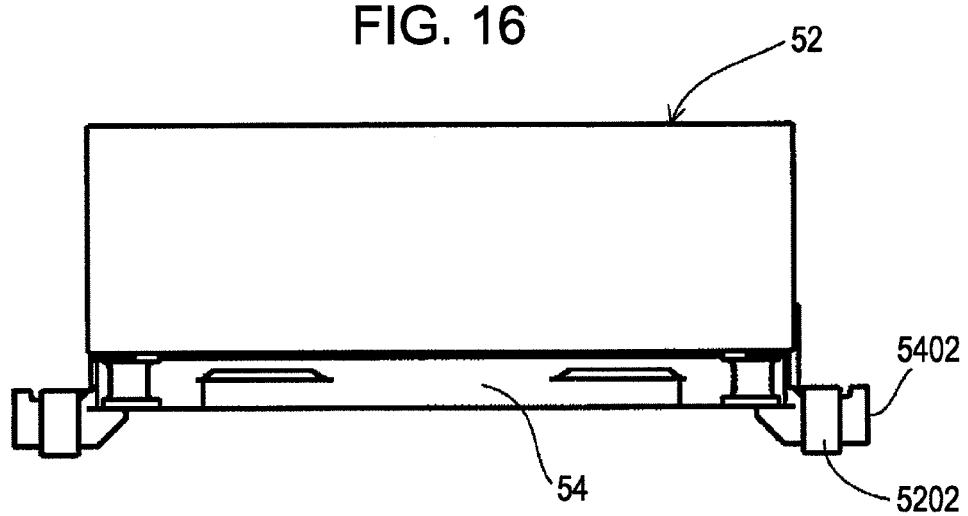
FIG. 16 is a view on arrow A in FIG. 15.
Figure 17:
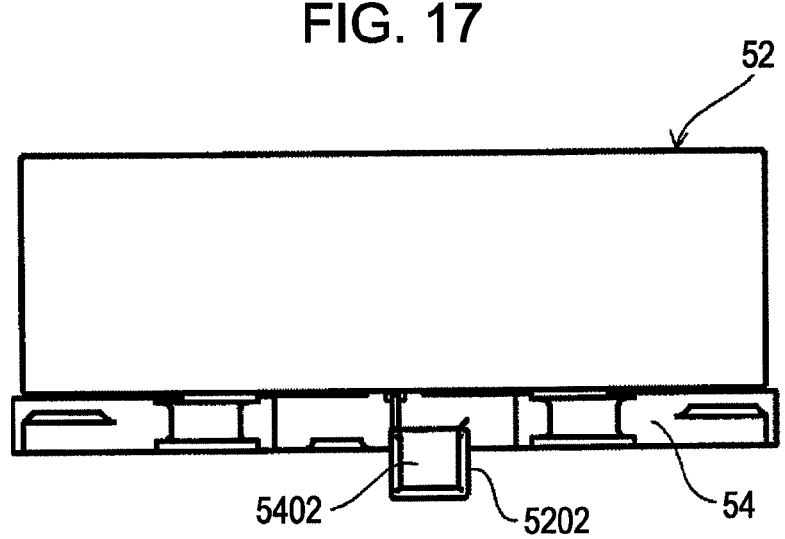
FIG. 17 is a view on arrow B in FIG. 15.
Figure 18:
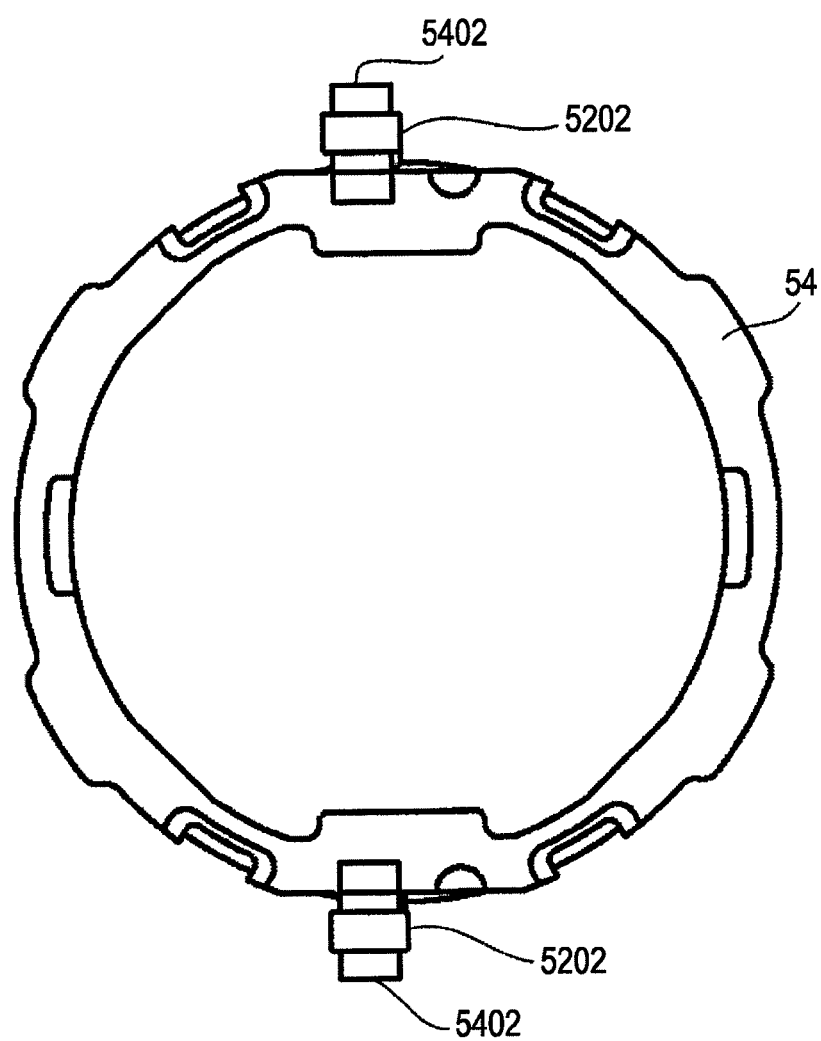
FIG. 18 is a rear view of the coil 52.

FIG. 13 is a front perspective view of the coil 52, FIG. 14 is a rear perspective view of the coil 52, FIG. 15 is a plan view of the coil 52, FIG. 16 is a view on arrow A in FIG. 15, FIG. 17 is a view on arrow B in FIG. 15, and FIG. 18 is a rear view of the coil 52.

The coil 52 is formed by winding a wire on a circumference centered on the optical axis of the image pickup optical system 28, and the outer diameter thereof is smaller than the inner diameter of the magnet 48.

An annular coil holder 54, which has almost the same outline as that of the coil 52 and is smaller than the coil 52 in the optical axis direction in plan view, is attached to a rear end face of the coil 52.

Shaft portions 5402 protrude outward in the radial direction from two opposing positions on the coil holder 54 that are out of phase with each other by 180 degrees. Both ends 5202 of the wire of the coil 52 are respectively wound around the shaft portions 5402.

(Image Pickup Element 36)

The image pickup element 36 picks up a subject image guided by the image pickup optical system 28.

As shown in FIGS. 5 and 6, the image pickup element 36 is provided on a front surface of the rectangular substrate 56.

In a state in which the image pickup element 36 is placed in the aperture 44 of the rear barrel 24, the substrate 56 is bonded to a rear surface of the bottom wall 42 of the rear barrel 24, and an optical filter (not shown) covering the aperture 44 is bonded to the front surface of the bottom wall 42, whereby the image pickup element 36 is sealed. Therefore, the image pickup element 36 is provided in the rear barrel 52.

(Cover 26)

As shown in FIGS. 2 and 9, the cover 26 includes a front face portion 2602 and side face portions 2604.

The front face portion 2602 is shaped like a rectangular plate, and covers the front surface of the front barrel 22.

An aperture 2606 is provided at a position where the front face portion 2602 faces the image pickup optical system 28.

The side face portions 2604 are respectively bent from four sides of the front face portion 2602, and cover four side portions of each of the front barrel 22 and the rear barrel 24.

One pair of side face portions 2604, of the four side face portions 2604, are provided with engaging grooves 2608 to be engaged with engaging projections 57 of the rear barrel 24.

By engagement of the engaging grooves 2608 of the cover 26 with the engaging projections 57, the front barrel 22 is clamped between the front face portion 2602 of the cover 26 and the bottom wall 42 of the rear barrel 24, whereby the front barrel 22 and the rear barrel 24 are coupled together.

(Lens Holding Member 30)

Figure 20:
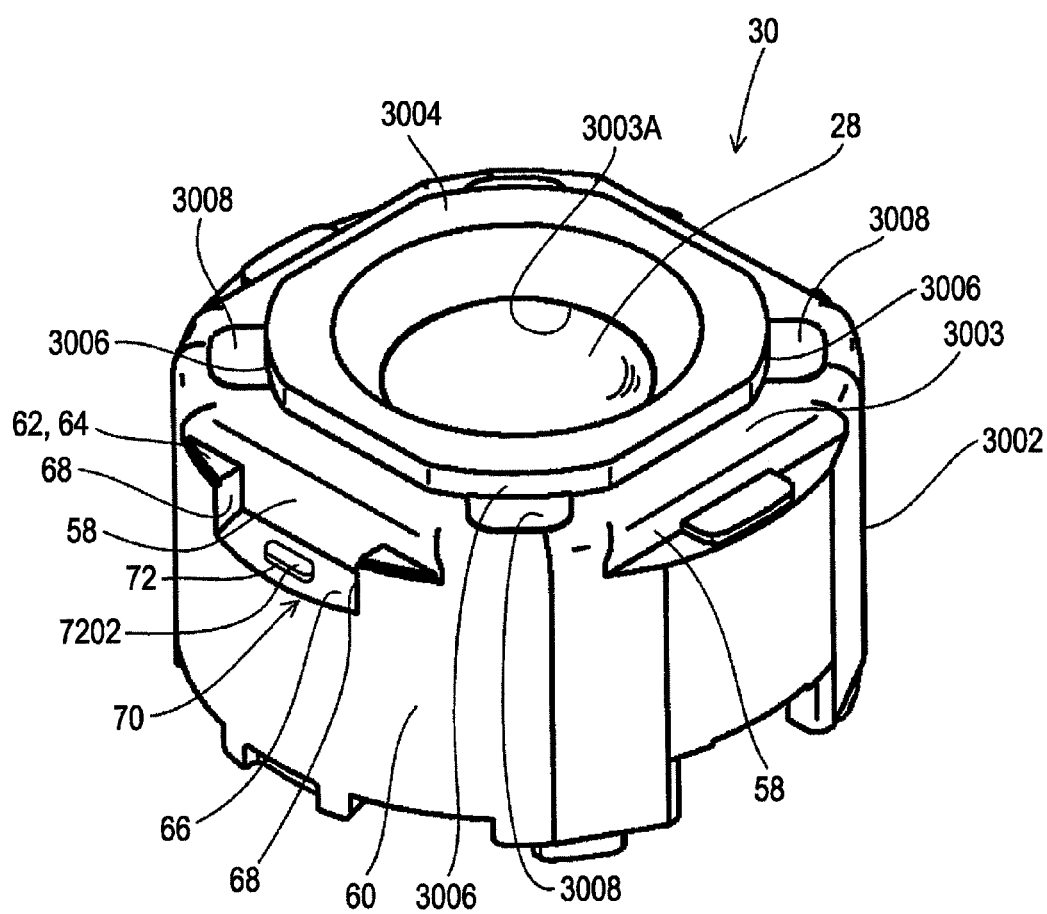
FIG. 20 is a front perspective view of a lens holding member 30.
Figure 21:
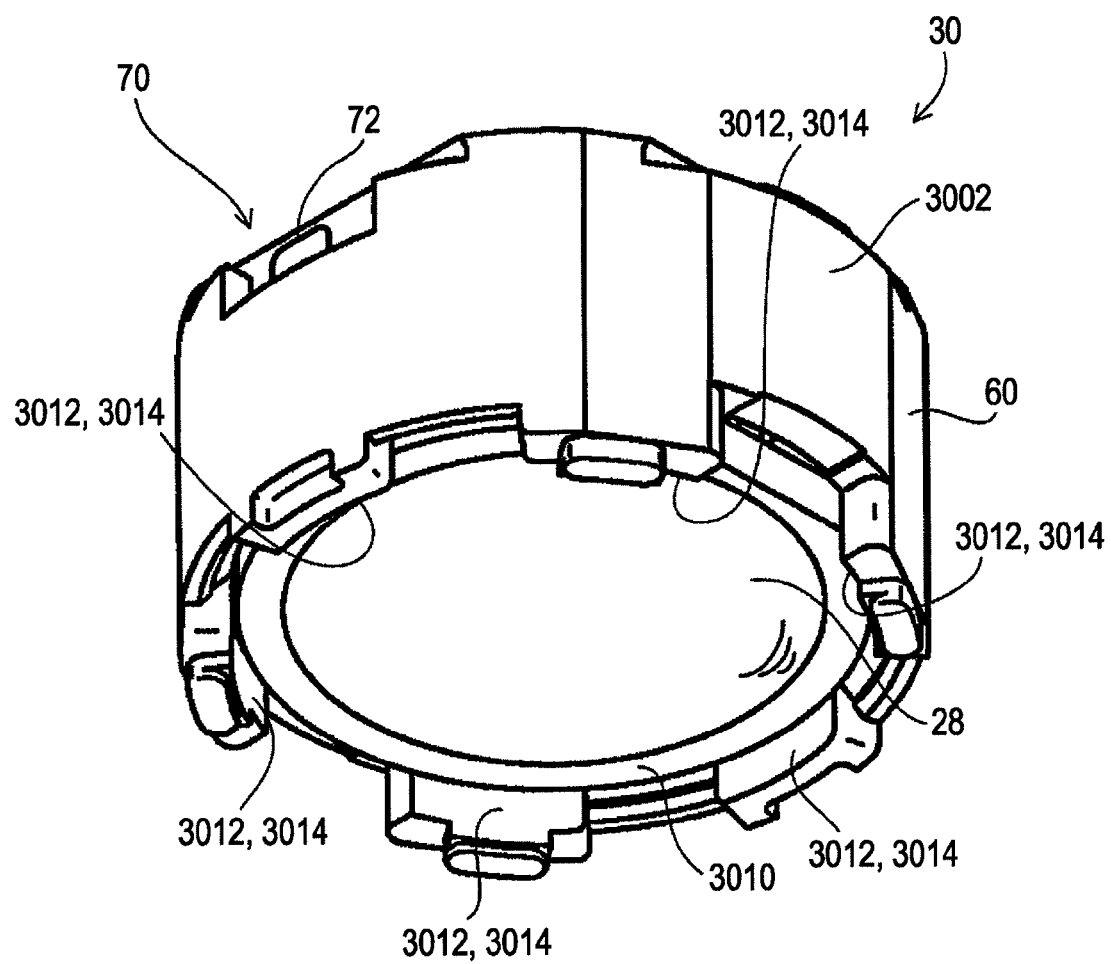
FIG. 21 is a rear perspective view of the lens holding member 30.
Figure 22:
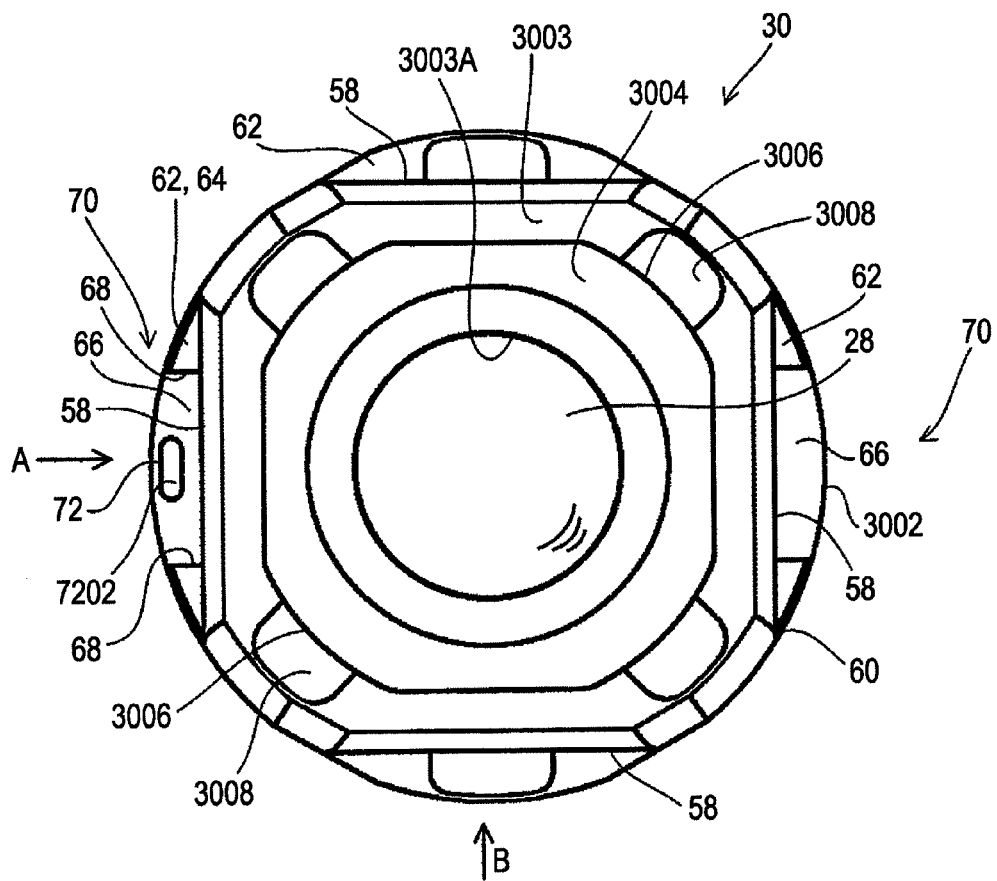
FIG. 22 is a plan view of the lens holding member 30.
Figure 23:
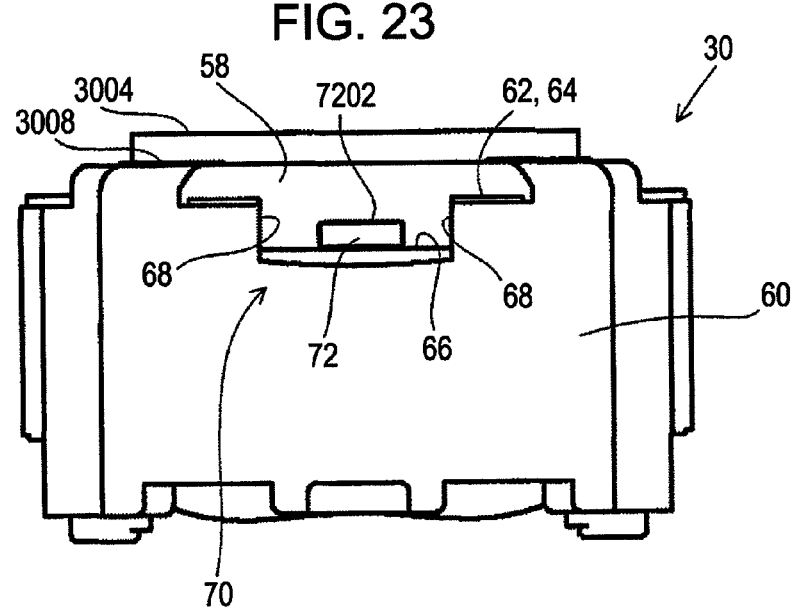
FIG. 23 is a view on arrow A in FIG. 22.
Figure 24:
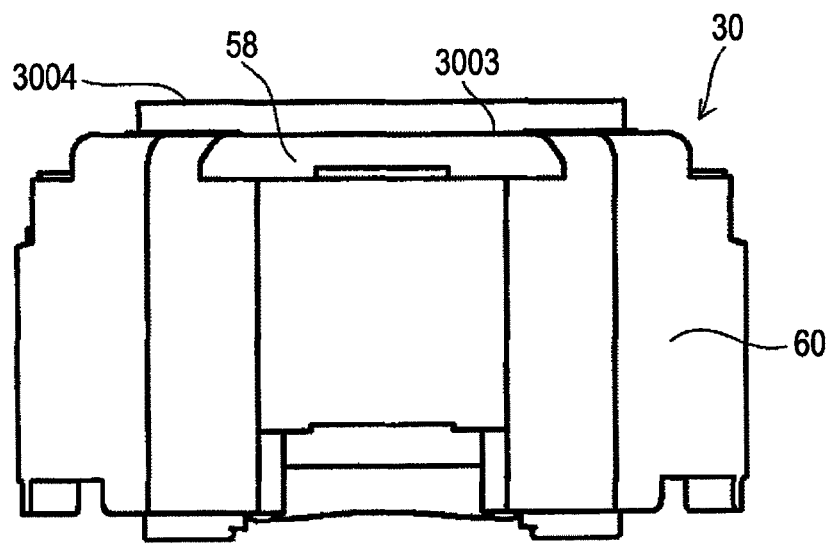
FIG. 24 is a view on arrow B in FIG. 22.
Figure 25:
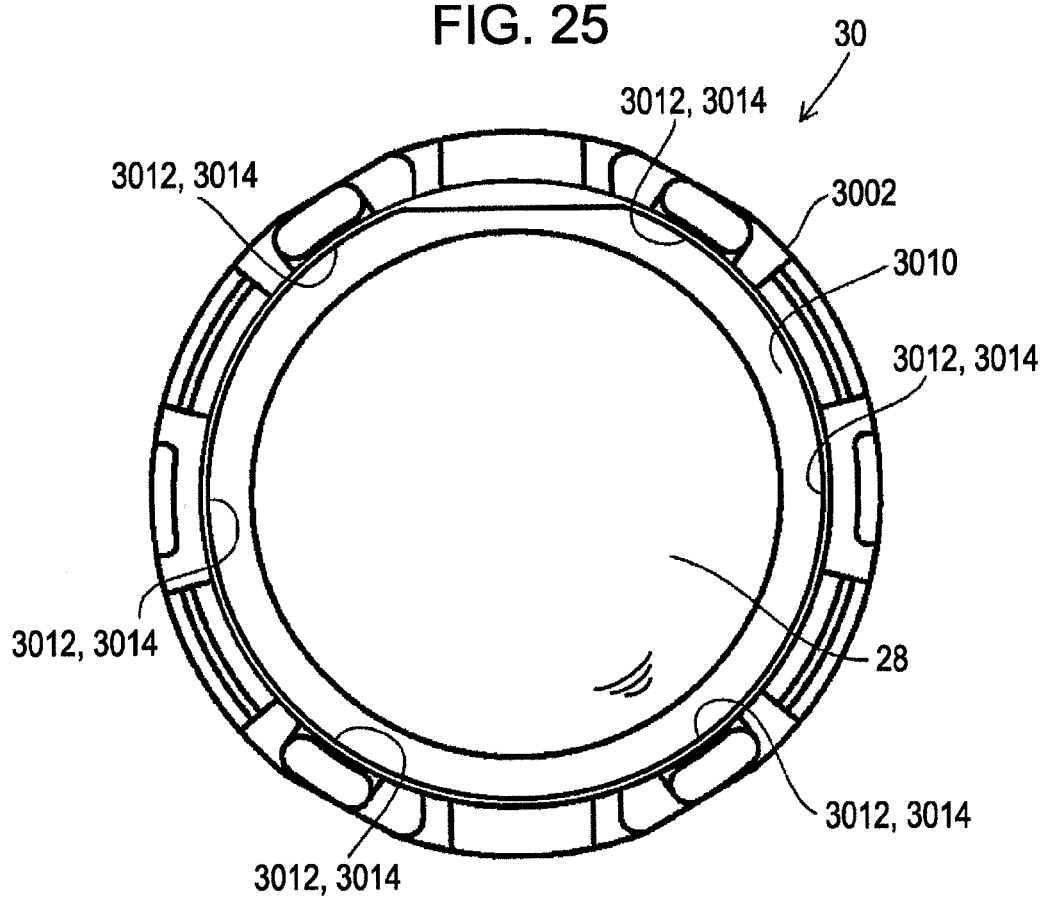
FIG. 25 is a rear view of the lens holding member 30.

FIG. 20 is a front perspective view of the lens holding member 30, FIG. 21 is a rear perspective view of the lens holding member 30, FIG. 22 is a plan view of the lens holding member 30, FIG. 23 is a view on arrow A in FIG. 22, FIG. 24 is a view on arrow B in FIG. 22, and FIG. 25 is a rear view of the lens holding member 30.

Figure 26:
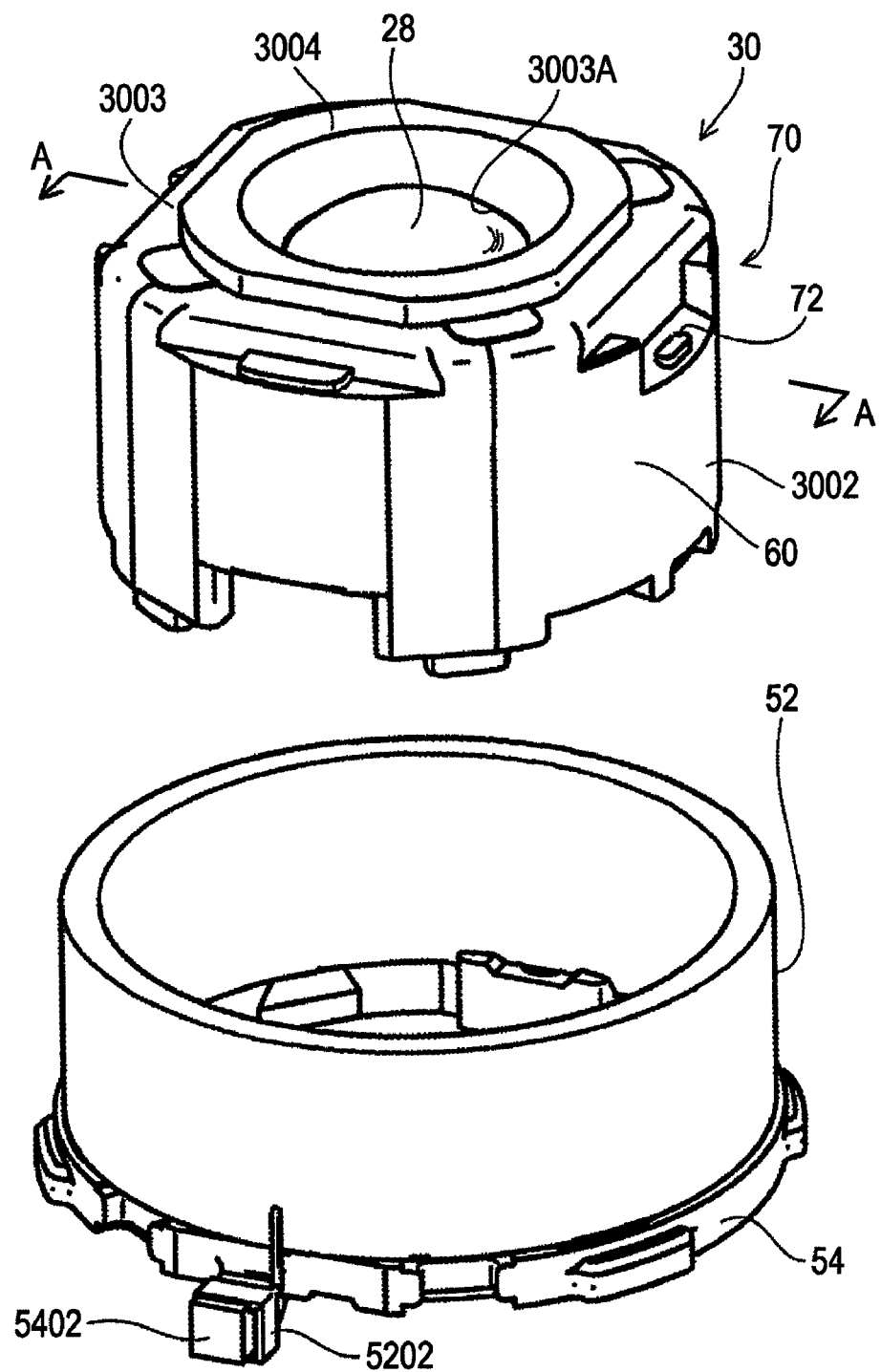
FIG. 26 is an assembly view of the lens holding member 30 and the coil 52.
Figure 27:
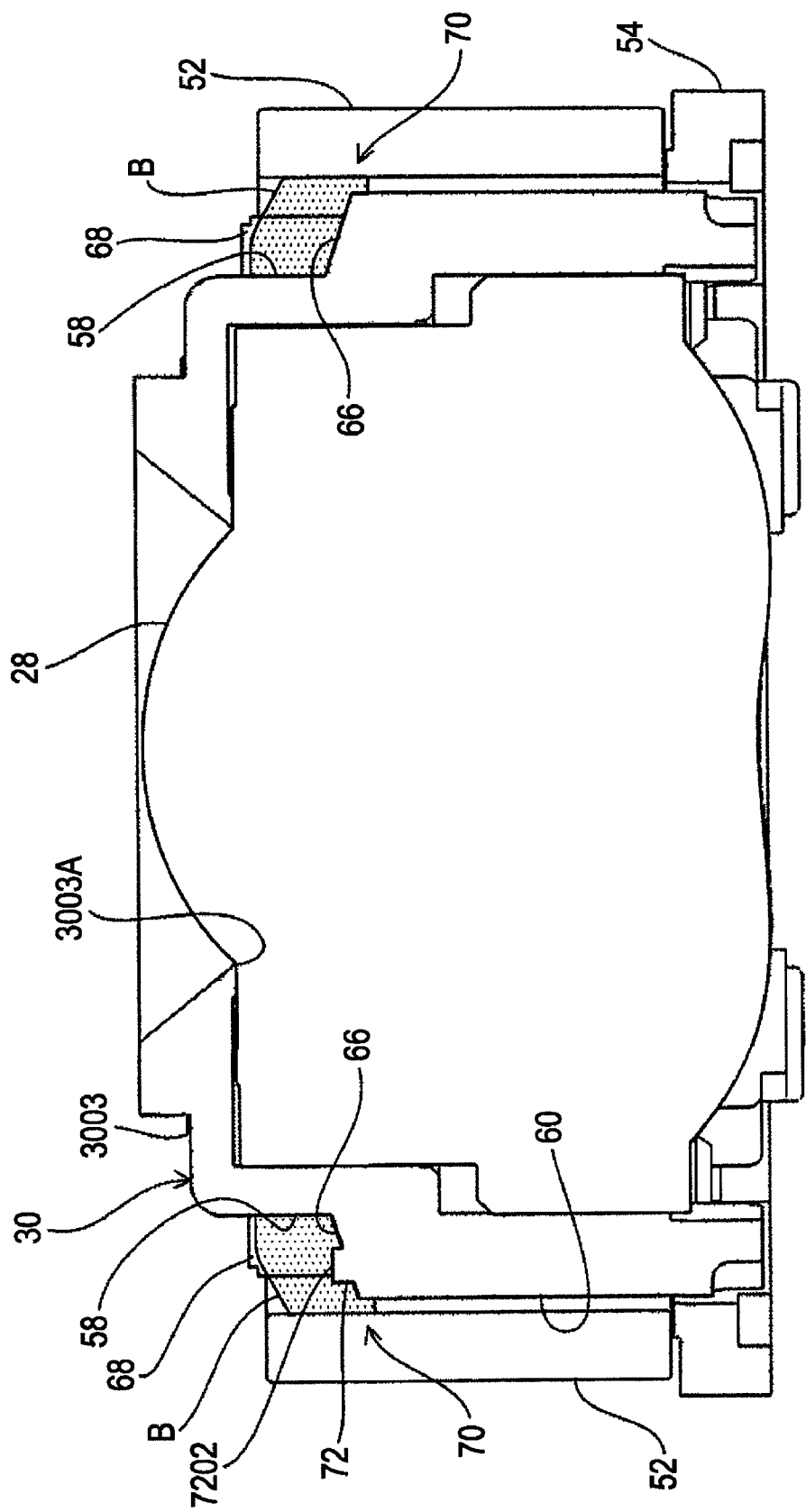
FIG. 27 is a cross-sectional view, taken along line A-A in FIG. 26, of the lens holding member 30 assembled in a posture shown in FIG. 26.

FIG. 26 is an assembly view of the lens holding member 30 and the coil 52, and FIG. 27 is a cross-sectional view, taken along line A-A, of the lens holding member 30 assembled in a posture shown in FIG. 26.

The lens holding member 30 is stored in the storage space S while holding the image pickup optical system 28, as shown in FIGS. 5 and 6.

As shown in FIGS. 20 to 25, the lens holding member 30 includes a cylindrical portion 3002 and an annular front portion 3003 for connecting the front of the cylindrical portion 3002. An aperture 3003A is provided in the center of the front portion 3003.

The image pickup optical system 28 includes a plurality of lens units, is stored in the cylindrical portion 3002, and faces forward through the aperture 3003A.

As shown in FIGS. 20 and 22, the front portion 3003 is provided with a bulging wall portion 3004 having an outer diameter smaller than an outer diameter of the cylindrical portion 3002. A peripheral surface of the bulging wall portion 3004 forms a cylindrical surface 3006 that extends on a circumference centered on the optical axis of the image pickup optical system 28.

Four front spring contact faces 3008 are provided on the outer periphery of the cylindrical surface 3006 and at four positions equally spaced in the circumferential direction in a manner such as to be placed on the rear side of the bulging wall portion 3004. These front spring contact faces 3008 extend on a plane orthogonal to the optical axis.

As shown in FIGS. 21 and 25, an annular rear spring contact face 3010 having an outer diameter smaller than the outer diameter of the cylindrical portion 3002 is provided at the rear end of the cylindrical portion 3002.

The rear spring contact face 3010 extends coaxially with the optical axis on a plane orthogonal to the optical axis.

Retaining projections 3012 project from six positions equally spaced in the circumferential direction at the rear end of the cylindrical portion 3002 on the outer periphery of the rear spring contact face 3010. Inner peripheral surfaces of the retaining projections 3012 form cylindrical surfaces 3014 that extend on a circumference centered on the optical axis of the image pickup optical system 28.

As shown in FIGS. 20, 22, 23, and 24, an outer peripheral surface of the cylindrical portion 3002 includes four outer faces 58 provided at the front end and extending in a rectangular shape, and a rear cylindrical face 60 extending in the form of a cylindrical face in the remaining portion except the front end.

As shown in FIGS. 26 and 27, the coil 52 is mounted on the rear cylindrical face 60, as will be described below.

Further, as shown in FIGS. 20, 22, and 23, crescent-shaped end face portions 62 facing forward are respectively provided at intersections of two opposing outer faces 58, of the four outer faces 58, with the rear cylindrical face 60.

Each of the end face portions 62 includes faces 64 provided at both ends, and a center face 66 provided closer to the rear end than the faces 64.

The center face 66, side faces 68 standing from both sides of the center face 66, and the outer face 58 constitute an adhesive filling recess 70 that will be described below.

The lens holding member 30 is molded by filling a molten synthetic resin from a gate of a mold into a product cavity, and a portion corresponding to the gate of the mold for molding remains as a gate portion 72 thereon, as shown in FIG. 20.

This gate portion 72 is provided in the center of the center face 66 of one of the two end face portions 62.

In this embodiment, the synthetic resin is polycarbonate. The synthetic resin contains fillers, such as glass fibers, to ensure the hardness required of the lens holding member 30.

The gate portion 72 projects from the center face 66, and a leading end in the projecting direction serves as a cut portion 7202 of the gate portion 72. The cut portion 7202 is where fillers existing in the gate portion 72 appear as powders when a vibration or an impact is applied thereto.

(Front Spring 32, Rear Spring 34)

The front spring 32 and the rear spring 34 constitute a guide mechanism that is provided in the storage space S and supports the lens holding member 30 so that the lens holding member 30 is movable along the optical axis of the image pickup optical system 28, as shown in FIGS. 5 and 6.

The front spring 32 is provided between the front barrel 22 and the lens holding member 30, and the rear spring 34 is provided between the rear barrel 24 and the lens holding member 30.

As shown in FIG. 3, the front spring 32 and the rear spring 34 are formed by thin and narrow pieces of a conductive metal material, and are annularly shaped so that apertures 3202 for the optical path of the image pickup optical system 28 are ensured in the centers thereof.

More specifically, the front spring 32 includes an annular plate portion 3204 having the aperture 3202 therein, and four support pieces 3206 connected to the outer periphery of the annular plate portion 3202, and is elastically deformable in the optical axis direction.

The front spring 32 is provided between the front barrel 22 and the lens holding member 30 while the outer peripheral portions of the support pieces 3206 are attached to four corners of the front of the peripheral wall 40 of the front barrel 22, the cylindrical surface 3006 of the bulging wall portion 3004 of the cylindrical portion 3002 of the lens holding member 30 shown in FIGS. 20 and 22 is inserted in the aperture 3202, and the annular plate portion 3204 is in contact with the four front spring contact faces 3008 of the lens holding member 30.

In this embodiment, as shown in FIG. 12, the outer peripheral portions of the four support pieces 3206 are attached to the four corners of the front of the peripheral wall 40 by insert molding by which the outer peripheral portions are buried during molding of the front barrel 22.

As shown in FIGS. 3 and 19, the rear spring 34 includes two spring sections 34A of the same shape.

Each spring section 34A has an arc-shaped portion 3404 extending on a semicircle.

The arc-shaped portions 3404 of the spring section 34A are bonded to the rear spring contact face 3010 inside the cylindrical surfaces 3014 of the retaining projections 3012 of the lens holding member 30 shown in FIGS. 21 and 25, whereby the aperture 3402 is formed inside the two arc-shaped portions 3404.

As shown in FIG. 3, two support pieces 3406 and 3408 are connected to the outer peripheries of the arc-shaped portions 3404, and each of the support pieces 3406 and 3408 has a hole 3410.

Therefore, four holes 3410 of the spring sections 34A are fitted on the pins 46 of the rear barrel 24, and the surroundings of the holes 3410 of the support pieces 3406 and 3408 are clamped between the front barrel 22 and the rear barrel 24, so that the rear spring 34 is provided between the rear barrel 24 and the lens holding member 30.

Further, as shown in FIG. 3, connecting pieces 3420 are respectively provided in middle portions of the arc-shaped portions 3404 of the spring sections 34A. Both ends 5202 of the wire of the coil 52 wound around the two shaft portions 5402 of the coil holder 54 shown in FIG. 13 are soldered to the connecting pieces 3420.

Also, tip portions of the support pieces 3408 of the spring sections 34A serve as external connecting terminals 3430 extending out of the coil 52. Therefore, the coil 52 is electrically connected to the external connecting terminals 3430 via the spring sections 34A.

The external connecting terminals 3430 are clamped between the two front projections 4020 of the front barrel 22 and the two rear projections 4220 of the rear barrel 24. Tip portions of the external connecting terminals 3430 are exposed outside from the leading ends of the front projections 4020 and the rear projections 4220, as shown in FIGS. 11 and 19.

Therefore, when a driving signal is supplied to the wire of the coil 52 via the two external connecting terminals 3430 of the rear spring 34, a magnetic field is generated from the coil 52.

By interaction between the magnetic field generated by the coil 52 and the magnetic field generated from the magnetic poles of the magnet 48, a force (thrust) in the optical axis direction is generated in the coil 52, whereby the lens holding member 30 and the image pickup optical system 28 held by the front spring 32 and the rear spring 34 move in the optical axis direction, and a subject image to be formed on the image pickup surface of the image pickup element 36 by the image pickup optical system 28 is focused.

Therefore, the magnet 48 and the coil 52 constitute the driving unit 38 for moving the lens holding member 30 along the optical axis of the image pickup optical system 28.
(Assembly of Lens Holding Member 30 and Coil 52)

Next, a description will be given of assembly of the lens holding member 30 and the coil 52.

As shown in FIGS. 26 and 27, the coil 52 is mounted on the rear cylindrical face 60 of the lens holder 30 while the front end of the coil 52 faces the rear end of the lens holder 30.

By mounting the coil 52 on the rear cylindrical face 60, as shown in FIG. 27, the center face 66, the side faces 68 standing from both sides of the center face 66, the outer face 58, and the inner peripheral surface of the coil 52 define an adhesive filling recess 70 that is open in a direction parallel to the optical axis of the image pickup optical system 28.

In this embodiment, two adhesive filling recesses 70 are spaced apart from each other in the circumferential direction.

In each adhesive filling recess 70, the center face 66 serves as a bottom face of the adhesive filling recess 70 facing in a direction parallel to the optical axis of the image pickup optical system 28.

The gate portion 72 is provided on the center face 66 of one of the adhesive filling recesses 70.

After the coil 52 is mounted on the rear cylindrical face 60 of the lens holder 30, the lens holder 30 and the coil 52 are positioned in the optical axis direction of the image pickup optical system 28 and in a plane orthogonal to the optical axis with an adjusting jig.

Subsequently, the adhesive filling recesses 74 are filled with adhesive B, so that the outer peripheral portion of the lens holding member 30 and the inner peripheral portion of the coil 52 are bonded together.

In this case, in one of the adhesive filling recesses 74, the gate portion 72 is buried in the adhesive B.

When the adhesive sets, mounting of the coil 52 on the lens holding member 30 is completed.

Subsequently, the rear spring 24 is attached to the lens holding member 30, thereby constructing a second unit U2 (FIG. 19) in which the lens holding member 30, the rear spring 24, the coil 52, and the coil holder 54 are assembled together.

Next, a method for assembling the camera module 20 will be described.

As shown in FIG. 19, a first unit U1 in which the front spring 32, the magnet 48, and the yoke 50 are incorporated in the front barrel 22, the second unit U2 having the above-described structure, and the rear barrel 24 are prepared.

Then, the second unit U2 is assembled with the rear barrel 24. More specifically, the pins 46 of the rear barrel 24 are inserted in the holes 3410 of the rear spring 34 so as to join the second unit U2 and the rear barrel 24.

Subsequently, the first unit U1 is assembled with the assembled unit. More specifically, the cylindrical surface 3006 of the bulging wall portion 3004 of the cylindrical portion 3002 of the lens holding member 30 is inserted in the aperture 3202 of the front spring 32, and the annular plate portion 3204 is brought into contact with the front spring contact faces 3008 of the lens holding member 30, thereby joining the first unit U1 and the second unit U2.

Finally, the cover 26 is placed on the first unit U1, and the engaging grooves 2608 are engaged with the engaging projections 57. More specifically, the cover 26 is placed on the first unit U1 so that the front barrel 22 is clamped between the upper face portion 2602 of the cover 26 and the bottom wall 42 of the rear barrel 24.

Thus, the first unit U1, the second unit U2, and the rear barrel 24 are coupled, thereby completing a camera module 20.

As described above, according to this embodiment, the gate portion 72 remaining in the lens holding member 30 is provided on the bottom face of the adhesive filling recess 70. Therefore, the lens holding member 60 and the coil 52 are bonded with the adhesive B filled in the adhesive filling recesses 70, and the gate portion 72 is buried in the adhesive B.

Hence, even if a vibration or impact is applied to the lens holding member 30, for example, by dropping the electronic apparatus 10 in which the camera module 20 is incorporated, the fillers can be reliably prevented from falling off in the form of powdered dust from the cut portion 7202 of the gate portion 72. Thus, dust will not adhere to the lens of the image pickup optical system 38 and the image pickup surface of the image pickup element 36. This is advantageous in improving the data quality of an picked-up image.

In addition, it is possible to omit a special treatment process for preventing generation of dust from the gate portion, for example, by coating the cut portion of the gate portion with adhesive or melting the cut portion by a heater, as in the related art. This is also advantageous in reducing the production cost.

Next, a description will be given of a structure for radiating heat generated from the image pickup element 36.

The image pickup element 36 is formed by, for example, a CCD or a C-MOS sensor, and generates heat with an image pickup operation.

When the temperature of the image pickup element 36 exceeds a predetermined temperature, the image pickup element 36 does not stably operate, or noise components in image pickup signals generated by the image pickup element 36 are increased. Therefore, it is necessary to effectively prevent a temperature rise of the image pickup element 36.

Accordingly, in this embodiment, heat generated from the image pickup element 36 is radiated using the yoke 50.

Figure 28:
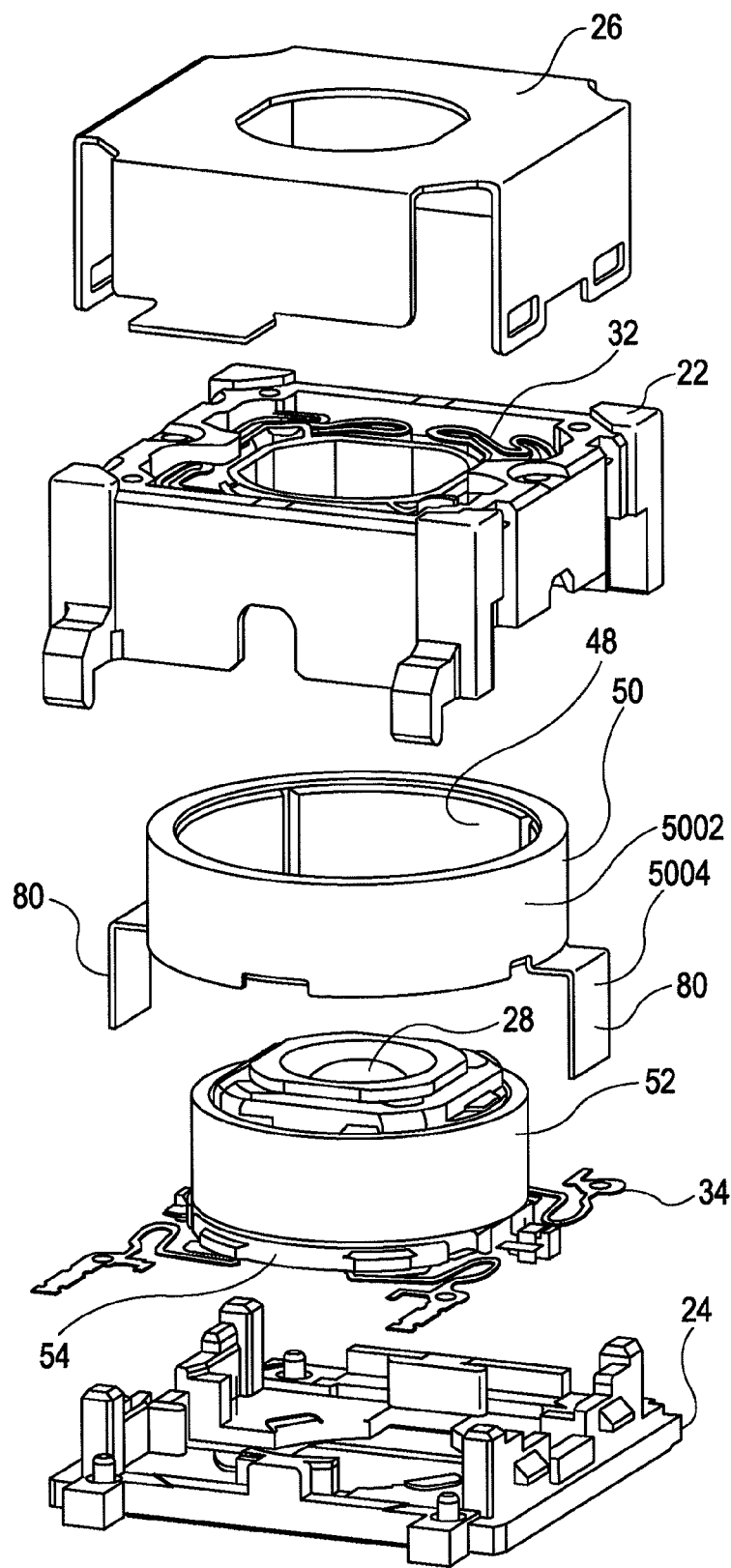
FIG. 28 is an exploded perspective view of a camera module 20 according to a first example having a heat radiation structure.
Figure 30:
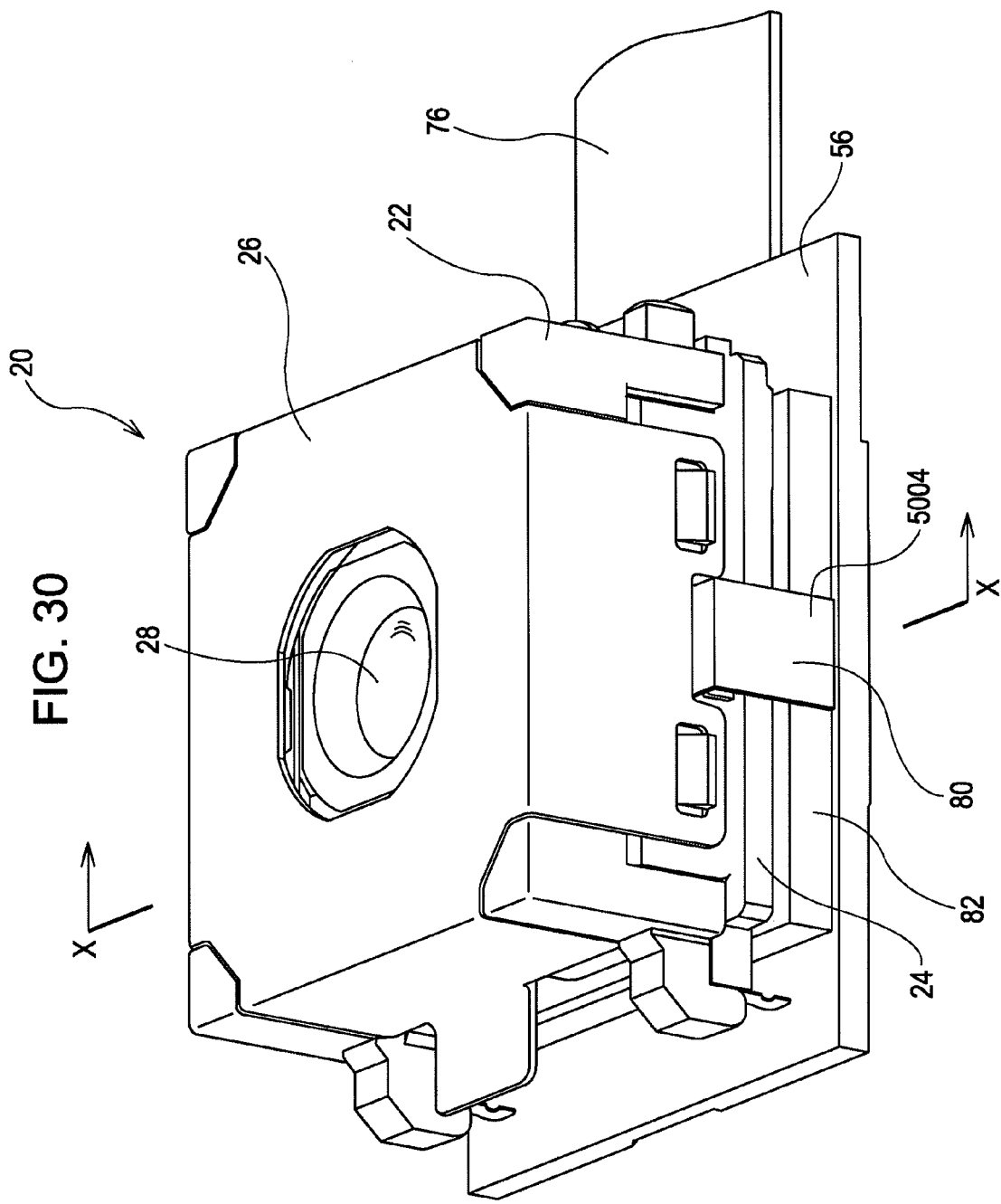
FIG. 30 is a perspective view of the camera module 20.
Figure 31:
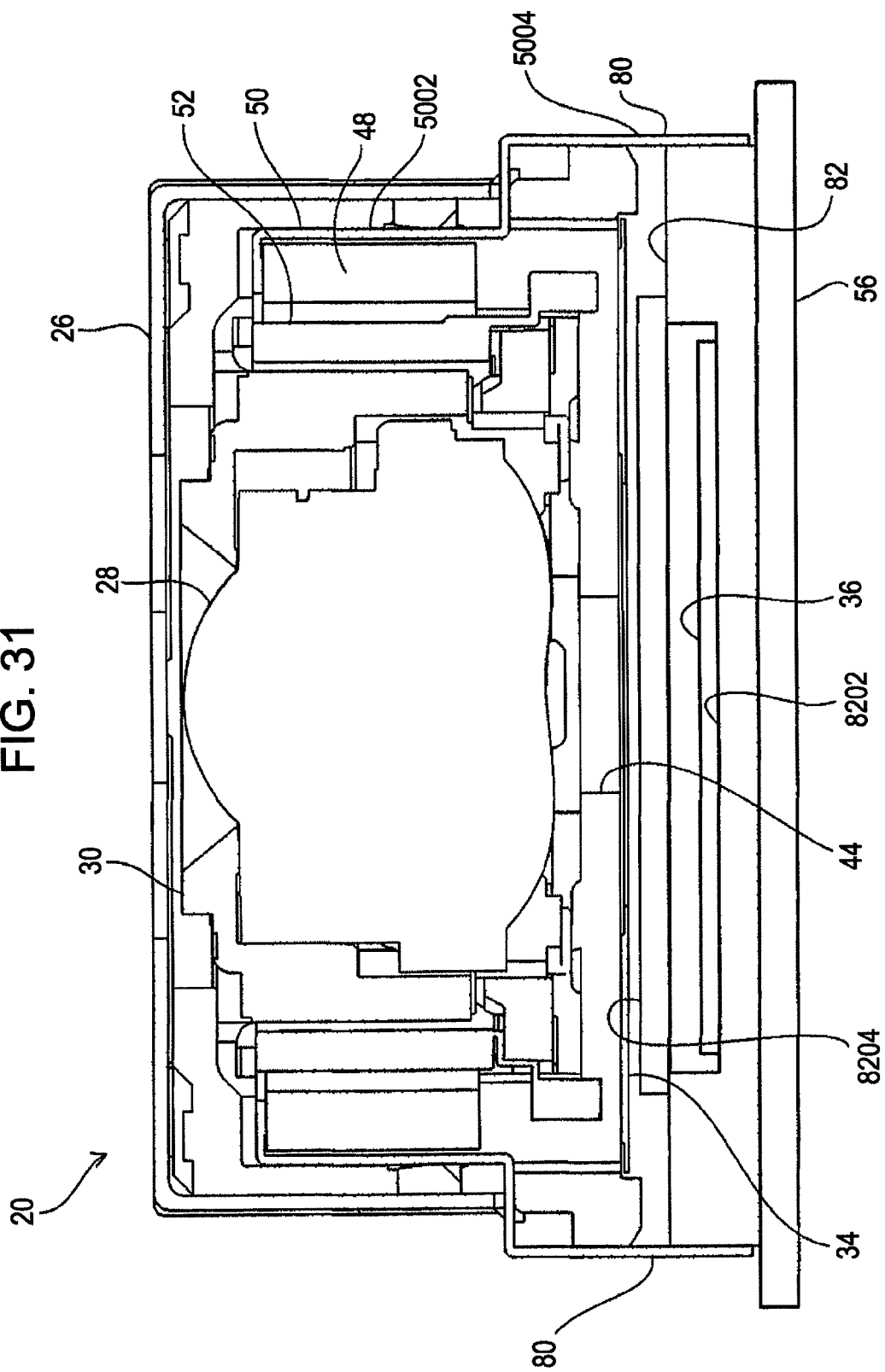
FIG. 31 is a cross-sectional view, taken along line X-X in FIG. 30.

FIG. 28 is an exploded perspective view of a camera module 20 according to a first example having a heat radiation structure, FIG. 29 is an explanatory view illustrating assembly of an image pickup element 36 with the camera module 20, FIG. 30 is a perspective view of the camera module 20, and FIG. 31 is a cross-sectional view, taken along line X-X in FIG. 30.

As shown in FIG. 31, the camera module 20 includes a lens holding member 30 for holding an image pickup optical system 28, an image pickup element 36 for picking up a subject image guided by the image pickup optical system 28, and a driving unit 38 for moving the lens holding member 30 along the optical axis of the image pickup optical system 28.

The driving unit 38 includes a coil 52 mounted on the outer periphery of the lens holding member 30, a magnet 48 facing the outer periphery of the coil 52, and a yoke 50 mounted on the outer periphery of the magnet 48.

The yoke 50 is formed of a magnetic material. As such a magnetic material, various known magnetic materials, such as silicon steel, soft iron, permalloy, and stainless steel, can be adopted.

Also, relay members 80 are provided to couple the image pickup element 36 and the yoke 50 and to transmit heat generated by the image pickup element 36 to the yoke 50.

As shown in FIGS. 28 to 31, for example, the relay members 80 are provided integrally with the yoke 50.

In this embodiment, the yoke 50 includes a cylindrical main body 5002 mounted on the outer periphery of the magnet 48, and two legs 5004 extending in the axial direction of the main body 5002 from two positions spaced apart from each other at an axial end of the main body 5002.

As shown in FIGS. 29 and 31, the image pickup element 36 is sealed in a package 82.

More specifically, the package 82 has a front surface facing the image pickup optical system 28, and a rear surface provided on the opposite side.

The front surface of the package 82 is provided with a rectangular storage recess 8202 that is open forward.

The image pickup element 36 is mounted on a bottom face of the storage recess 8202, and an aperture of the storage recess 8202 is covered with a seal glass 8204 that also functions as an optical filter. The seal glass 8204 is sealed on the front surface of the package 82.

The rear surface of the package 82 is mounted on a front surface of a substrate 56. The substrate 56 is connected to a signal processing circuit or the like, which is not shown, via a flexible board 76.

The relay members 80 are coupled to the yoke 50 and to the package 82.

Therefore, the relay members 80 are coupled to the image pickup element 36 with the package 82 disposed therebetween.

With this structure, heat generated in the image pickup element 36 is transmitted from the package 82 to the yoke 50 via the relay members 80, and is radiated from the yoke 50.

Therefore, unlike the related art, heat generated in the image pickup element 36 can be effectively radiated without an exclusive heat radiation member such as a heat sink. This is advantageous in improving the quality of image pickup signals generated by the image pickup element 36 and stabilizing the operation of the image pickup element 36 while reducing the cost and size of the camera module 20.

Further, since the yoke 50 extends in the circumferential direction outside the lens holding member 30 in the radial direction, it ensures the largest surface area and volume among the components of the camera module 20. Therefore, a sufficient heat radiation effect can be advantageously obtained by the yoke 50.

Next, a second example will be described.

FIG. 32 is a cross-sectional view of a camera module 20 according to a second example having a heat radiation structure.

As shown in FIG. 32, an image pickup element 36 is sealed in a package 82, and the package 82 is mounted on a substrate 56.

Relay members 80 are coupled to a yoke 50 and to the substrate 56.

More specifically, soldering pads 5610 are provided in portions where a front surface of the substrate 56 having the package 82 mounted thereon faces the relay members 80. The relay members 80 and the soldering pads 5610 are coupled by soldering using solder H.

In addition, since a seal glass 8204 provided on a front surface of the package 82 and the soldering pads 5610 provided on the front surface of the substrate 56 are spaced from each other in the thickness direction of the substrate 56, foreign substances, such as solder balls produced in an operation of soldering the relay members 80 and the soldering pads 5610, are prevented from adhering to the seal glass 8204.

Therefore, the relay members 80 are coupled to the image pickup element 36 with the substrate 56 and the package 82 disposed therebetween.

With this structure, heat generated by the image pickup element 36 is transmitted from the package 82 to the substrate 56, is further transmitted from the substrate 56 to the yoke 50 via the relay members 80, and is then radiated from the yoke 50.

Therefore, the second example also provides advantages similar to those of the first example.

While the image pickup element 36 is sealed in the package 82 in the first and second examples, it may be mounted on the substrate 56.

In this case, the relay members 80 are coupled to the yoke 50 and to the substrate 56. The relay members 80 and the substrate 56 can be coupled, for example, by soldering.

That is, the relay members 80 are coupled to the image pickup element 36 with the substrate 56 disposed therebetween.

In this structure, heat generated in the image pickup element 36 is transmitted from the substrate 56 to the yoke 50 via the relay members 80, and is then radiated from the yoke 50.

Therefore, advantages similar to those of the first example are achieved.

While the electronic apparatus 10 in which the camera module 20 is incorporated is a mobile telephone in this embodiment, the camera module of the present invention is widely applicable to various electronic apparatuses, for example, portable information terminals such as a PDA and a notebook personal computer, a digital still camera, or a video cameras.

The invention claimed is:

1. A camera module comprising:

a lens holding member for holding an image pickup optical system; and a driving unit for moving the lens holding member along an optical axis of the image pickup optical system, the lens holding member being a molded component molded using a mold, and having a gate portion remaining on a surface thereof corresponding to a gate of the mold, the driving unit including a coil mounted on the outer periphery of the lens holding member, and a magnet facing the outer periphery of the coil, characterized in that an adhesive filling recess that opens in a direction parallel to the optical axis is defined by an outer peripheral portion of the lens holding member and an inner peripheral portion of the coil, the adhesive filling recess includes a bottom face provided in the lens holding member and facing in the direction parallel to the optical axis, the gate portion is located on the bottom face, and the outer peripheral portion of the lens holding member and the inner peripheral portion of the coil are bonded with an adhesive filled in the adhesive filling recess, and the gate portion is buried in the adhesive.

2. The camera module according to claim 1, characterized in that a plurality of the adhesive filling recesses are spaced in a circumferential direction of the lens holding member, and the gate portion is located on a bottom face of one of the plurality of adhesive filling recesses.

3. The camera module according to claim 1, characterized in that the molded component is formed of a synthetic resin containing a filler.

4. The camera module according to claim 3, characterized in that the filler is a glass fiber.

* * * * *